(12) United States Patent
Shinagawa et al.

(10) Patent No.: US 10,250,427 B2
(45) Date of Patent: Apr. 2, 2019

(54) RECEIVER, FRAME SYNCHRONIZATION METHOD, TRANSMITTER, TRANSMISSION METHOD, AND PROGRAM

(71) Applicant: SONY SEMICONDUCTOR SOLUTIONS CORPORATION, Kanagawa (JP)

(72) Inventors: Masashi Shinagawa, Tokyo (JP); Makoto Noda, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 53 days.

(21) Appl. No.: 15/503,087

(22) PCT Filed: Aug. 11, 2015

(86) PCT No.: PCT/JP2015/072721
§ 371 (c)(1),
(2) Date: Feb. 10, 2017

(87) PCT Pub. No.: WO2016/027728
PCT Pub. Date: Feb. 25, 2016

(65) Prior Publication Data
US 2017/0257245 A1 Sep. 7, 2017

(30) Foreign Application Priority Data

Aug. 20, 2014 (JP) .................................. 2014-167497
Jan. 27, 2015 (JP) .................................. 2015-013176

(51) Int. Cl.
*H04L 27/26* (2006.01)
*H04B 1/7073* (2011.01)
*H04W 56/00* (2009.01)

(52) U.S. Cl.
CPC ....... *H04L 27/2656* (2013.01); *H04B 1/7073* (2013.01); *H04W 56/00* (2013.01); *H04W 56/001* (2013.01)

(58) Field of Classification Search
CPC .... H04L 27/26; H04L 27/2656; H04W 56/00; H04W 56/001

(Continued)

(56) References Cited

U.S. PATENT DOCUMENTS 7,251,269 B2 * 7/2007 Paul ..................... H04B 1/7085
375/150
8,385,390 B2 * 2/2013 Zhang ................ H04B 1/70735
375/142

(Continued)

FOREIGN PATENT DOCUMENTS

JP 2009-260504 A 11/2009
JP 2011-521557 A 7/2011

OTHER PUBLICATIONS

International Search Report prepared by the Japan Patent Office dated Oct. 21, 2015, for International Application No. PCT/JP2015/072721.

(Continued)

*Primary Examiner* — Man U Phan
(74) *Attorney, Agent, or Firm* — Sheridan Ross P.C.

(57) ABSTRACT

The present technology relates to a receiver, a frame synchronization method, a transmitter, a transmission method, and a program that allows for enhancing frame synchronization performance without reducing throughput. A receiver of an aspect of the present technology receives signals of a frame having a preamble including a frame detection signal sequence formed by a repetition of a known signal sequence, followed by a frame synchronization signal sequence formed by the known signal sequence or an inverse sequence thereof, performs convolution arithmetic operation of a known correlation sequence and cross-correlation between a received signal sequence and the frame synchronization signal sequence, and ensures synchronization of the frame while regarding predetermined time when a value more than or equal to a threshold value or a maximum value is obtained. The present technology can be applied to a device that transmits and receives data.

20 Claims, 27 Drawing Sheets

(58) Field of Classification Search
USPC .................................. 370/328–352
See application file for complete search history.

(56) References Cited

U.S. PATENT DOCUMENTS

| | | | | |
|---|---|---|---|---|
| 8,537,880 | B2* | 9/2013 | Agarwal | H04H 40/90 |
| | | | | 375/211 |
| 9,313,754 | B2* | 4/2016 | Zhang | H04B 1/70735 |
| 2009/0175261 | A1* | 7/2009 | Oh | H04L 1/0079 |
| | | | | 370/350 |
| 2017/0187767 | A1* | 6/2017 | Wang | H04L 65/4076 |
| 2017/0367006 | A1* | 12/2017 | Ino | H04W 28/06 |

OTHER PUBLICATIONS

Huang, Y.S. et al., Design and implementation of synchronization detection for IEEE 802.15. 3c, VLSI Design, Automation and Test (VSLI-DAT), 2011 International Symposium on. IEEE, 2011, pp. 1-4.

\* cited by examiner

FIG. 21

| P | MAXIMUM DYNAMIC RANGE | A | B | LEADING SEQUENCE OF C |
|---|---|---|---|---|
| 2 | 3L | a | $\bar{a}$ | [b] |
| 3 | 5L | a | $\bar{a}$ | [$\bar{b}$b], [b$\bar{b}$] |
| 4 | 7L |   | $\bar{a}$ | [ba$\bar{a}$], [$\bar{b}$aa], [$\bar{b}$ba]<br>[aab], [aa$\bar{b}$], [aa$\bar{b}$] |
|   |   | a | b | [$\bar{b}$ab], [a$\bar{b}\bar{b}$] |
|   |   |   | $\bar{b}$ | [ba$\bar{b}$], [a$\bar{b}$b] |
| 5 | 10L | a | $\bar{a}$ | [$\bar{a}$aaa], [$\bar{a}$aaaa] |
| 6 | 13L | a | $\bar{a}$ | [$\bar{a}$baaa], [ab$\bar{b}$aaa], [a$\bar{b}$abb], [ababb] |
| 7 | 16L | a | $\bar{a}$ | [$\bar{a}$aaaaa], [a$\bar{b}$baaa], [a$\bar{b}\bar{b}$aaa], [b$\bar{b}\bar{b}\bar{b}$a],<br>[b$\bar{b}\bar{b}\bar{b}\bar{b}$a] |

FIG. 26

| @N=7 | RDS | | DIFFERENCE BETWEEN MAXIMUM VALUE AND MINIMUM VALUE OF RDS | | DELAY VECTOR | WEIGHT VECTOR |
|---|---|---|---|---|---|---|
| | a | b | a | b | | |
| NEW | 0 | −16 | 9 | 22 | [16 64 8 4 2 32 1] | [−1 1 1 1 1 −1 1] |
| 11ad | 0 | 16 | 15 | 22 | [1 8 2 4 16 32 64] | [−1 −1 −1 −1 1 −1 −1] |

*FIG. 27*

11ad
Ga: 0x950C9A036AF39A036AF365FC6AF39A03 (LSB first)
Gb: 0x950C9A036AF39A03950C9A03950C65FC (LSB first)

NEW
a: 0xA9A6A9A6303F303FA95956A630C0CF3F (LSB first)
b: 0x030C030C9A959A9503F3FC0C9A6A6595 (LSB first)

RECEIVER, FRAME SYNCHRONIZATION METHOD, TRANSMITTER, TRANSMISSION METHOD, AND PROGRAM

CROSS REFERENCE TO RELATED APPLICATIONS

This application is a national stage application under 35 U.S.C. 371 and claims the benefit of PCT Application No. PCT/JP2015/072721 having an international filing date of 11 Aug. 2015, which designated the United States, which PCT application claimed the benefit of Japanese Patent Application No. 2014-167497 filed 20 Aug. 2014 and Japanese Patent Application No. 2015-013176 filed 27 Jan. 2015, the disclosures of which are incorporated herein by reference in their entirety.

TECHNICAL FIELD

The present technology relates to a receiver, a frame synchronization method, a transmitter, a transmission method, and a program. In particular, the present technology relates to a receiver, a frame synchronization method, a transmitter, a transmission method, and a program that are enabled to enhance frame synchronization performance without reducing throughput.

BACKGROUND ART

In wireless or wired data transmission, generally a bit sequence of transmission data is divided into frames or packet units and data is transmitted using the frames or packets. Hereinafter, the case where data transmission is performed in units of frames. A frame is a unit of a group of a bit sequence transmitted at a time.

When data is transmitted in units of frames, a device on a transmission side inserts a known signal for synchronization in the head of a frame in order to allow a device on a reception side to synchronize. The device on the reception side performs frame synchronization by detecting the known signal for synchronization and thereby acquires the transmission data stored in the frames.

One frame usually includes a preamble, including a known signal, arranged in the head, and a header and a payload arranged subsequent to the preamble. A header includes frame attribute information such as a transmission method and an address. A payload includes the bit sequence of the divided transmission data.

CITATION LIST

Patent Document

Patent Document 1: Japanese Translation of PCT International Application Publication No. 2011-521557

SUMMARY OF THE INVENTION

Problems to be Solved by the Invention

Frame synchronization is performed by calculating cross-correlation between a received signal sequence and a known signal sequence and specifying a position where cross-correlation greater than a threshold value is obtained or a position where the maximum cross-correlation is obtained as a position of a preamble.

Therefore, in order to prevent undetection or false detection of a known signal in a device on a reception side and to reduce failure probability of frame synchronization, it is preferable that the number of known signals is increased to extend the preamble. In this case, however, a region that can be ensured for a payload becomes relatively narrow and thus data throughput disadvantageously decreases.

The present technology has been achieved in consideration to such circumstances and allows for enhancing frame synchronization performance without reducing throughput.

Solutions to Problems

A receiver of one aspect of the present technology includes: a reception unit that receives signals of a frame having a preamble including a frame detection signal sequence, formed by a repetition of one type of known signal sequence of a first length, arranged in the head thereof and a frame synchronization signal sequence, formed by the one type of known signal sequence of the first length or an inverse sequence thereof, arranged subsequent to the frame detection signal sequence; a convolution arithmetic operation unit that performs convolution arithmetic operation of a known correlation sequence of a second length determined on the basis of a peak value of cross-correlation between the signal sequence and the frame synchronization signal sequence in the preamble and cross-correlation between a received signal sequence and the frame synchronization signal sequence at time preceding predetermined time by a period of time corresponding to a product of an integer greater than or equal to zero and less than a value representing the second length and a value representing the first length; and a synchronization unit that ensures synchronization of the frame while regarding the predetermined time when a value more than or equal to a threshold value or a maximum value is obtained as a result of the convolution arithmetic operation as reception time of a last signal sequence that forms the frame synchronization signal sequence.

The known correlation sequence can be determined on the basis of the peak value of cross-correlation between the signal sequence in the preamble and the frame synchronization signal sequence at time represented by $(K+N-n) \cdot L-1$, where: time t at the head of the preamble satisfies $t=0$; the number of repetitions of the one type of known signal sequence in the frame detection signal sequence is denoted as K; the number of signal sequences that forms the frame synchronization signal sequence is denoted as N; the first length is denoted as L; the second length is denoted as S; and the integer greater than or equal to zero and less than S is denoted as n.

The known correlation sequence can be determined on the basis of a sign of the peak value.

The value representing the second length is the same value as the number of signal sequences forming the frame synchronization signal sequence or equivalent to the number of signal sequences, forming the frame synchronization signal sequence, added with one.

In one aspect of the present technology, signals of a frame having a preamble including a frame detection signal sequence, formed by a repetition of one type of known signal sequence of a first length, arranged in the head thereof and a frame synchronization signal sequence, formed by the one type of known signal sequence of the first length or an inverse sequence thereof, arranged subsequent to the frame detection signal sequence are received by a reception unit and convolution arithmetic operation of a known correlation sequence of a second length determined on the basis of a peak value of cross-correlation between the signal sequence and the frame synchronization signal sequence in the preamble and cross-correlation between a received signal sequence and the frame synchronization signal sequence at time preceding predetermined time by a period of time corresponding to a product of an integer greater than or equal to zero and less than a value representing the second length and a value representing the first length is performed by a convolution arithmetic operation unit Moreover, synchronization of the frame is ensured by a synchronization unit while the predetermined time when a value more than or equal to a threshold value or a maximum value is obtained as a result of the convolution arithmetic operation is regarded as reception time of a last signal sequence that forms the frame synchronization signal sequence.

A transmitter of another aspect of the present technology includes: a preamble generation unit that generates a preamble including, a frame detection signal sequence formed by a repetition of one type of known signal sequence of a length L that is a first length, a frame synchronization signal sequence of a length N·L formed by two types of known signal sequences of a length L including the one type of known signal sequence or inverse sequences of the two types of known signal sequences, and a channel estimation signal sequence formed by the two types of known signal sequences and the inverse sequences, in the order mentioned, wherein, where a signal sequence of a length P·L formed by the frame synchronization signal sequence and leading signal sequences of the channel estimation signal sequence are used as a synchronization sequence used for frame synchronization, the preamble, which satisfies that a maximum value of a difference between a value at a last bit position and a value at another position in the synchronization sequence of likelihood information obtained by performing convolution arithmetic operation of a known correlation sequence of a second length determined on the basis of a peak value of cross-correlation between the signal sequence of the preamble and the synchronization sequence and cross-correlation between a received signal sequence and the synchronization sequence at time preceding predetermined time by a period of time corresponding to a product of an integer greater than or equal to zero and less than a value representing the second length and a value representing the first length, satisfies any one of: 3·L, where P=2; 5·L, where P=3; 7·L, where P=4; 10·L, where P=5; 13·L, where P=6; and 16·L, where P=7.

In another aspect of the present technology, includes: a preamble is generated, the preamble including, a frame detection signal sequence formed by a repetition of one type of known signal sequence of a length L that is a first length, a frame synchronization signal sequence of a length N·L formed by two types of known signal sequences of a length L including the one type of known signal sequence or inverse sequences of the two types of known signal sequences, and a channel estimation signal sequence formed by the two types of known signal sequences and the inverse sequences, wherein, where a signal sequence of a length P·L formed by the frame synchronization signal sequence and leading signal sequences of the channel estimation signal sequence are used as a synchronization sequence used for frame synchronization, the preamble, which satisfies that a maximum value of a difference between a value at a last bit position and a value at another position in the synchronization sequence of likelihood information obtained by performing convolution arithmetic operation of a known correlation sequence with a second length determined on the basis of a peak value of cross-correlation between the signal sequence of the preamble and the synchronization sequence and cross-correlation between a received signal sequence and the synchronization sequence at time preceding predetermined time by a period of time corresponding to a product of an integer greater than or equal to zero and less than a value representing the second length and a value representing the first length, satisfies any one of: 3·L, where P=2; 5·L, where P=3; 7·L, where P=4; 10·L, where P=5; 13·L, where P=6; and 16·L, where P=7.

Effects of the Invention

The present technology allows for enhancing frame synchronization performance without reducing throughput.

Note that effects described herein are not necessarily limited. Any one of the effects described in the present disclosure may be included.

BRIEF DESCRIPTION OF DRAWINGS

FIG. 6 is a diagram explaining cross-correlation between a received signal sequence and a known signal sequence a.

FIG. 21 is a diagram illustrating exemplary synchronization sequences.

FIG. 26 is a diagram illustrating a result of comparison between CDSs and RDSs.

FIG. 27 is a diagram illustrating a specific example of signal sequences a and b.

MODE FOR CARRYING OUT THE INVENTION

Embodiments implementing the present technology will be described below. Explanation will be given in the order below.

1. Transmission System
2. Principal of Frame Synchronization
3. Exemplary Application of Frame Synchronization
4. Configuration and Operation of Receiver
4-1. First Exemplary Configuration of Synchronization Unit
4-2. Processing by Receiver
4-3. Second Exemplary Configuration of Synchronization Unit
4-4. Third Exemplary Configuration of Synchronization Unit
5. Exemplary Application to Other Preambles <<1. Transmission System>>

Figure 1:
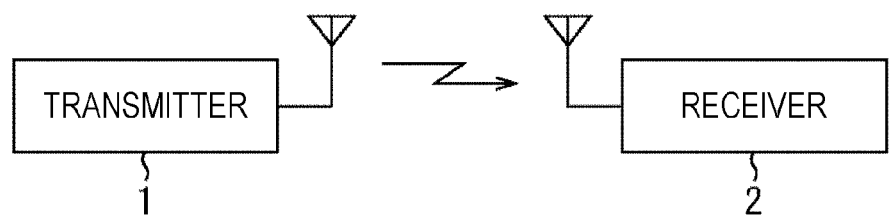
FIG. 1 is a diagram illustrating an exemplary configuration of a transmission system according to an embodiment of the present technology.

FIG. 1 is a diagram illustrating an exemplary configuration of a transmission system according to an embodiment of the present technology.

A transmission system in FIG. 1 includes a transmitter 1 and a receiver 2.

The transmitter 1 performs, on current transmission data, processing such as error correction encoding, inserting headers and preambles, and modulation. In the transmitter 1, various data such as audio visual (AV) data is processed as current transmission data.

The transmitter 1 transmits data obtained by performing various processing to the receiver 2 via a wireless or wired transmission path. Data transmission via a wireless transmission path includes IEEE 802.15.3c that is an international standard of wireless personal area network (PAN) using 60 GHz band and IEEE 802.11ad that is an international standard of wireless local area network (LAN) using 60 GHz band.

In a wireless or wired data transmission system, generally current transmission data is divided into a plurality of frames and thereby stored. Data transmission is performed in units of frames.

Figure 2:
FIG. 2 is a diagram illustrating an exemplary structure of a frame.

FIG. 2 is a diagram illustrating an exemplary structure of a frame.

As illustrated is FIG. 2, a preamble is arranged in the head of each frame and a header and a payload are arranged after the preamble. The preamble includes a known signal and a header includes frame attribute information such as a transmission method and an address. The payload includes a bit sequence of the divided transmission data.

Figure 3:
FIG. 3 is a diagram illustrating an exemplary structure of a preamble.

FIG. 3 is a diagram illustrating an exemplary structure of a preamble.

Usually, the preamble includes: a frame detection signal sequence A that is a signal sequence for detection of a frame; a frame synchronization signal sequence B that is a signal sequence for frame synchronization; and a channel estimation signal sequence C that is a signal sequence for channel estimation.

Preambles defined by IEEE 802.15.3c and IEEE 802.11ad also have basically the same structure as that illustrated in FIG. 3. A device on a reception side performs auto gain control (AGC) and frame detection using the frame detection signal sequence A and frame synchronization using the frame synchronization signal sequence B. The device on the reception side further performs channel estimation using the channel estimation signal sequence C.

Figure 4:
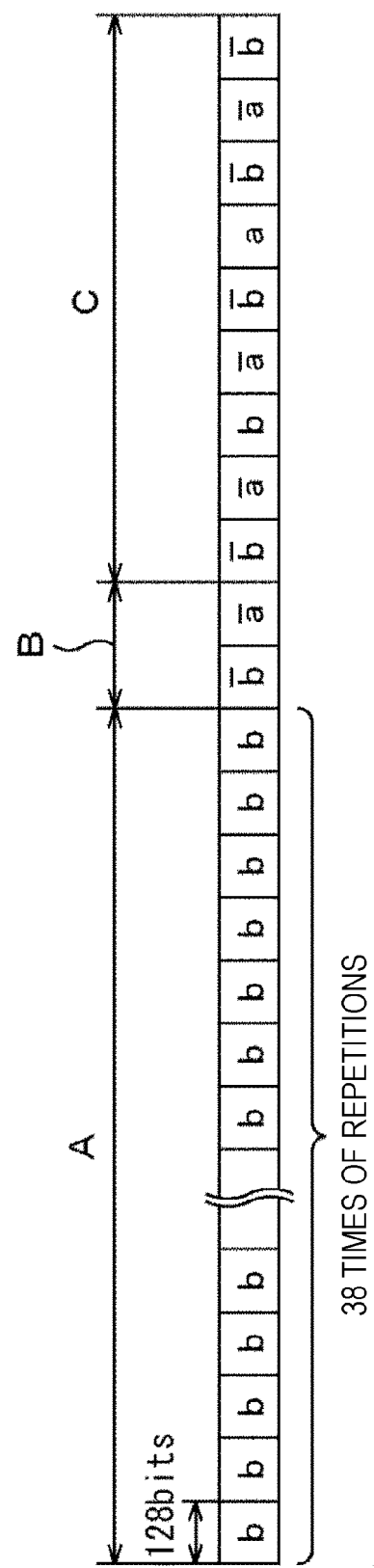
FIG. 4 is a diagram illustrating a structure of a control PHY preamble of IEEE 802.11ad.

FIG. 4 is a diagram illustrating a structure of the preamble (control PHY preamble) of IEEE 802.11ad.

The preamble of IEEE 802.11ad includes known signal sequences a and b of Golay complementary sequences of the length of 128 symbols (128 bits) and inverse sequences −a and −b that are bit inverse sequences of the known signal sequences a and b, respectively. In the drawings and herein below, a bit inverse sequence is denoted with a sign "−" above or in front of a symbol representing a signal sequence as appropriate.

The frame detection signal sequence A is 38 times of repetitions of the known signal sequence b. The frame detection signal sequence A is represented by the following formula (1).

[Mathematical Formula 1]

$$A = [b\ b\ b\ b\ b\ b\ b\ b\ \ldots\ b\ b\ b] \quad (1)$$

The frame synchronization signal sequence B includes the inverse sequence −b and the inverse sequence −a in the order mentioned. The frame synchronization signal sequence B is represented by the following formula (2).

[Mathematical Formula 2]

$$B = [\bar{b}\ \bar{a}] \quad (2)$$

The channel estimation signal sequence C includes the known signal sequences a and b and the inverse sequences −a and −b. The channel estimation signal sequence C is represented by the following formula (3).

[Mathematical Formula 3]

$$C = [\bar{b}\ \bar{a}\ b\ \bar{a}\ \bar{b}\ a\ \bar{b}\ \bar{a}\ \bar{b}] \quad (3)$$

Referring back to the explanation of FIG. 1, the receiver 2 performs demodulation processing on a received signal and performs frame synchronization using a preamble having a structure as described above. The receiver 2 performs channel estimation and equalization processing and thereafter performs processing such as error correction, thereby acquiring the current transmission data.

<<2. Principal of Frame Synchronization>>

Here, the principals of frame synchronization performed in the receiver 2 will be described.

The frame detection signal sequence A included in the preamble includes K times of repetitions of one type of known signal sequence b of a length L. The frame synchronization signal sequence B includes two types of known signal sequences of a length L or inverse sequences thereof. The frame synchronization signal sequence B has a length of N·L.

The frame synchronization signal sequence B is represented as in the following formula (6) using a known signal sequences D of N known signals represented by formula (4) and a spreading code sequence P represented by formula (5).

[Mathematical Formula 4]

$$D = [d^0 \ d^1 \ \ldots \ d^{N-1}] \qquad (4)$$

[Mathematical Formula 5]

$$P = [p^0 \ p^1 \ \ldots \ p^{N-1}] \qquad (5)$$

[Mathematical Formula 6]

$$B = [p^0 \ d^0 \ p^1 \ d^1 \ \ldots \ p^{N-1} \ d^{N-1}] \qquad (6)$$

Here, the receiver 2 derives cross-correlation $y_t$ between a received signal sequence r and the frame synchronization signal sequence B at time t. The cross-correlation $y_t$ is represented by the following formula (7).

[Mathematical Formula 7]

$$y_t = \sum_{l=0}^{N-1} p^l \sum_{k=0}^{L-1} d_k^l r_{t-(N-l) \cdot L + 1 + k} \qquad (7)$$

Here, $c_t^l$ represented by the following formula (8) is defined.

[Mathematical Formula 8]

$$c_t^l := \sum_{k=0}^{L-1} d_k^l r_{t-(N-l) \cdot L + 1 + k} \qquad (8)$$

The cross-correlation $y_t$ is represented as in the following formula (9) from formula (7) and formula (8).

[Mathematical Formula 9]

$$y_t = \sum_{l=0}^{N-1} p^l c_t^l \qquad (9)$$

A known correlation sequence Q of a length S is defined as formula (10). The known correlation sequence Q is predetermined on the basis of a peak value of cross-correlation between the signal sequence and the frame synchronization signal sequence B that form the whole preamble. How to determine the known correlation sequence Q will be described later.

[Mathematical Formula 10]

$$Q = [q^0 \ q^1 \ \ldots \ q^{S-1}] \qquad (10)$$

In this case, the receiver 2 obtains likelihood information $z_t$ by convolution arithmetic operation of the known correlation sequence Q and the cross-correlation $y_t$. The likelihood information $z_t$ is represented as in the following formula (11). Value k is an integer greater than or equal to zero and less than S.

[Mathematical Formula 11]

$$z_t = \sum_{k=0}^{S-1} q^k y_{t-k \cdot L} \qquad (11)$$

The receiver 2 performs frame synchronization by detecting time t when the likelihood information $z_t$ is more than or equal to a threshold value or time t when the likelihood information $z_t$ reaches the maximum value and specifying the detected time t as reception time of the last bit of the frame synchronization signal sequence B.

Here, a method to determine the known correlation sequence Q will be described. The known correlation sequence Q is predetermined and is given to the receiver 2.

Where time t of the head of the preamble sequence is t=0 and an element of the preamble sequence at time t is denoted as $g_t$, cross-correlation $x_t$ between the preamble sequence and the frame synchronization signal sequence B is represented by the following formula (12).

[Mathematical Formula 12]

$$x_t = \sum_{l=0}^{N-1} p^l \sum_{k=0}^{L-1} d_k^l g_{t-(N-l) \cdot L + 1 + k} \qquad (12)$$

When an integer greater than or equal to zero and less than S is denoted as n (0≤n<S), the known correlation sequence Q is determined on the basis of a peak value of the cross-correlation $x_t$ at time represented by (K+N−n)·L−1, that is, cross-correlation $x_{(K+N-n) \cdot L-1}$.

For example, assuming that the cross-correlation $x_{(K+N-n) \cdot L-1}$ is determined on the basis of a sign derived by application to a sign function represented by the following formula (13), the known correlation sequence Q is represented as in the following formula (14).

[Mathematical Formula 13]

$$\text{sgn}(x_t) = \begin{cases} 1: & x_t > 0 \\ 0: & x_t = 0 \\ -1: & x_t < 0 \end{cases} \qquad (13)$$

[Mathematical Formula 14]

$$Q = [q^0 \ q^1 \ \ldots \ q^{S-1}] \qquad (14)$$
$$= [\text{sgn}(x_{(K+N) \cdot L-1}) \ \text{sgn}(x_{(K+N-1) \cdot L-1}) \ \ldots \ \text{sgn}(x_{(K+N-S+1) \cdot L-1})]$$

<<3. Exemplary Application of Frame Synchronization>>

Next, a case where the above method is applied to frame synchronization using the preamble of IEEE 802.11ad having the structure in FIG. 4 will be described.

Figure 5:
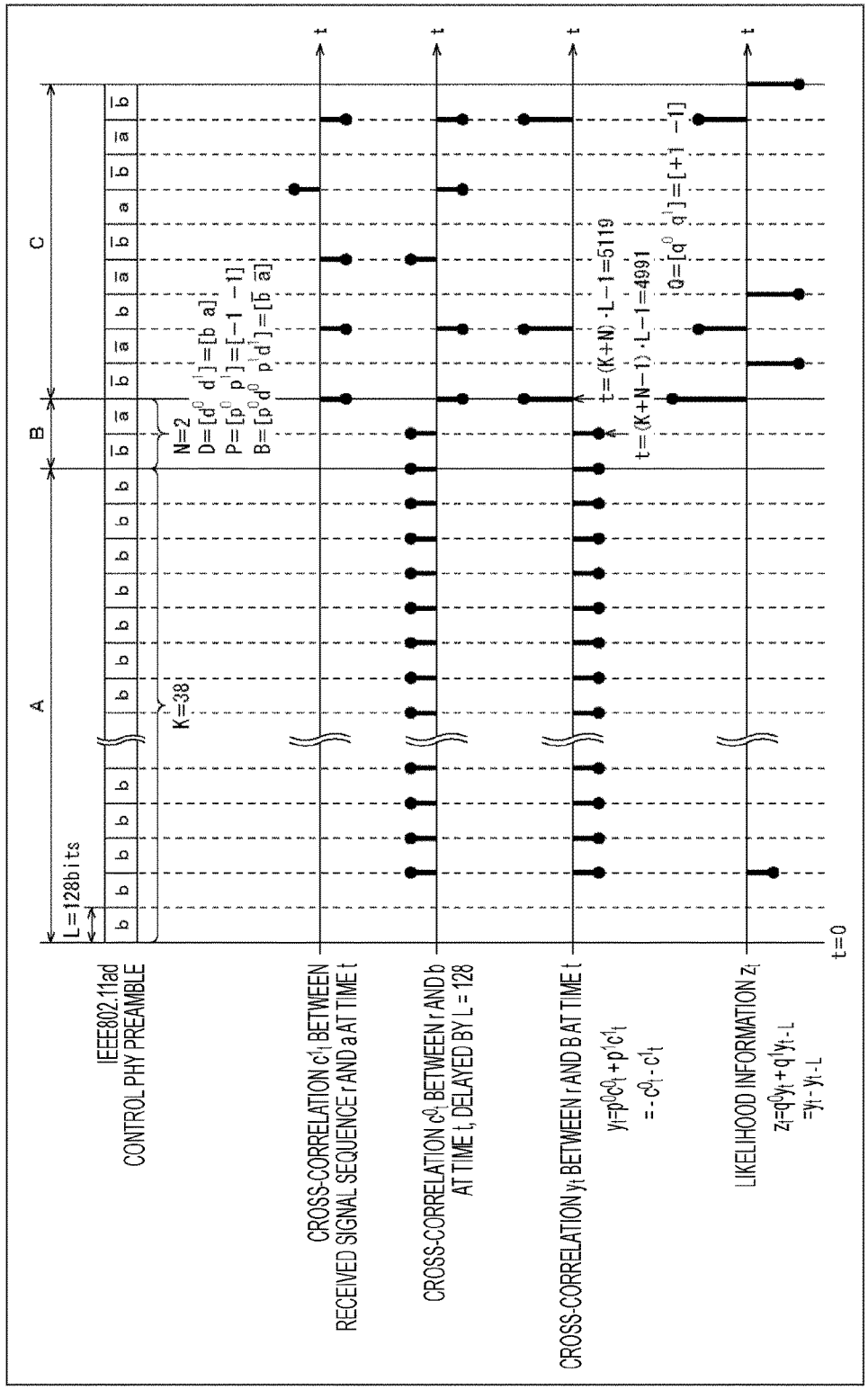
FIG. 5 is a diagram schematically illustrating processing of frame synchronization.

FIG. 5 is a diagram schematically illustrating processing of frame synchronization performed in the receiver 2.

As illustrated in an upper portion of FIG. 5, the length L of the known signal sequence is L=128 when the preamble of IEEE 802.11ad is used. The number of repetitions K of the known signal sequence b included in the frame detection signal sequence A is K=38.

Moreover, the number N of known signal sequences that form the frame synchronization signal sequence B satisfies N=2 and N known signal sequences D that form the frame synchronization signal sequence B is represented by the following formula (15).

[Mathematical Formula 15]

$$D=[d^0\ d^1]=[b\ a] \quad (15)$$

The spreading code sequence P for forming the frame synchronization signal sequence B is represented by the following formula (16). The frame synchronization signal sequence B is represented as in the following formula (17) from formula (15) and formula (16).

[Mathematical Formula 16]

$$P=[p^0\ p^1]=[-1\ -1] \quad (16)$$

[Mathematical Formula 17]

$$B=[p^0 d^0\ p^1 d^1]=[p^0 b\ p^1 a]=[\bar{b}\ \bar{a}] \quad (17)$$

In this case, the receiver 2 calculates cross-correlation $y_t$ between the received signal sequence r and the frame synchronization signal sequence B at time t. Since N=2 and the spreading code sequence P is represented by formula (16), the cross-correlation $y_t$ is represented as in the following formula (18) from formula (9).

[Mathematical Formula 18]

$$y_t=-c^0_t-c^1_t \quad (18)$$

Here, when cross-correlation between the received signal sequence r and the known signal sequence a at time t is denoted as $c^1_t$, with L=128 and by applying $d^1$=a, which is represented by formula (15), into formula (8), $c^1_t$ is represented as in the following formula (19).

[Mathematical Formula 19]

$$c^1_t = \sum_{k=0}^{127} a_k r_{t-127+k} \quad (19)$$

Here, when cross-correlation between the received signal sequence r and the known signal sequence b at time t is denoted as $c'^0_t$, and cross-correlation where $c'^0_t$ is delayed by 128 time that corresponds to L is denoted as $c^0_t$, applying L=128 and $d^0$=b represented by formula (15) to formula (8) results in $c'^0_t$ and $c^0_t$ represented as in the following formulas (20) and (21), respectively.

[Mathematical Formula 20]

$$c'^0_t = \sum_{k=0}^{127} b_k r_{t-127+k} \quad (20)$$

[Mathematical Formula 21]

$$c'^0_{t-128} = \sum_{k=0}^{127} b_k r_{t-255+k} = c^0_t \quad (21)$$

$$c^0_t = \sum_{k=0}^{127} b_k r_{t-255+k}$$

Figure 6:
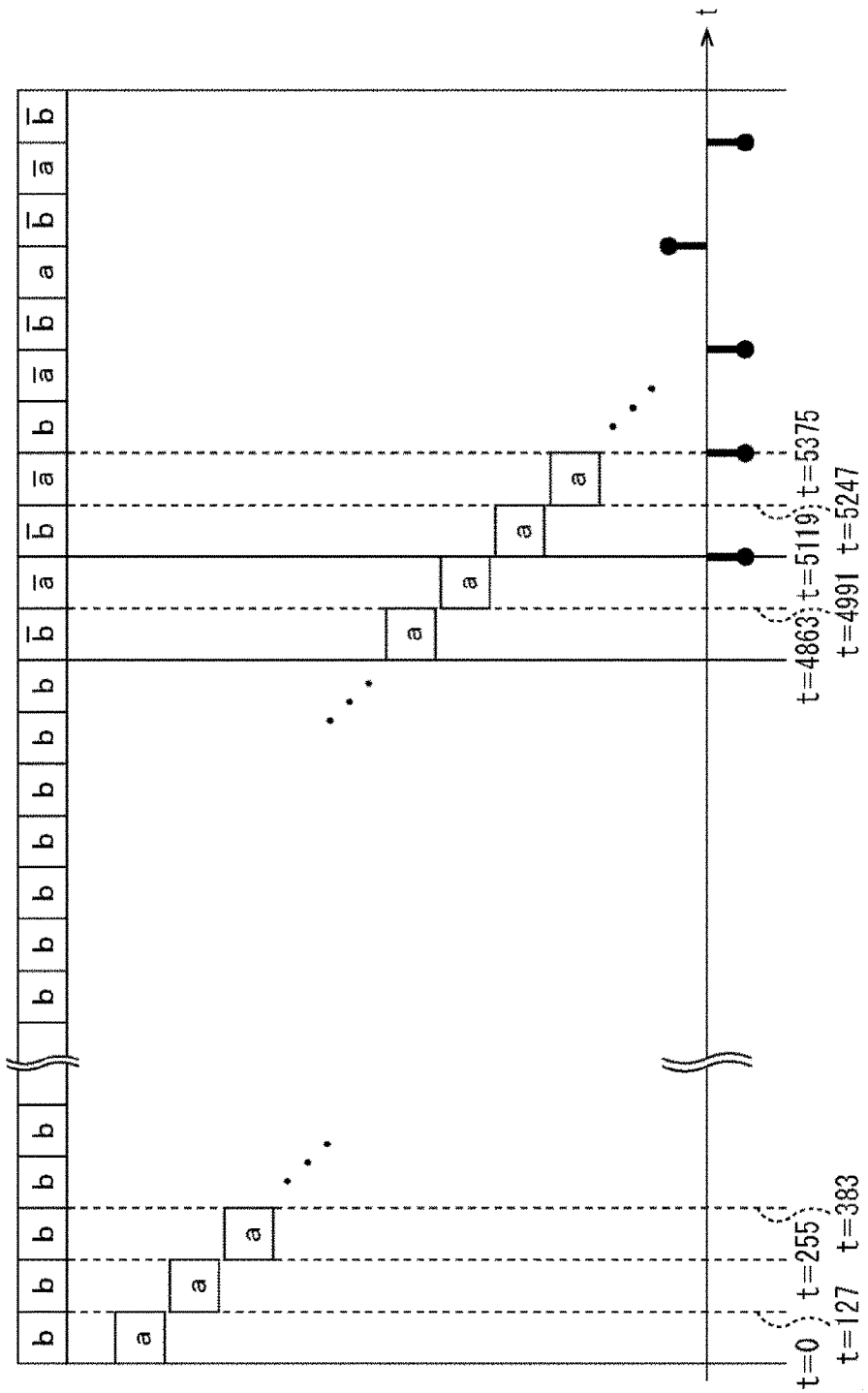

FIG. 6 is a diagram explaining cross-correlation between the received signal sequence r and the known signal sequence a.

A peak of cross-correlation between the received signal sequence r and the known signal sequence a occurs when 128 bits at time t (with time t as a reference, a signal sequence received from time t−127 to time t) correspond with the known signal sequence a.

Therefore, as illustrated in FIG. 6, no peak of cross-correlation occurs during t=0-4991 during which the known signal sequence b or the inverse sequence −b thereof is received. Furthermore, a peak of negative cross-correlation occurs at timing of t=5119 when the inverse sequence −a that forms the frame synchronization signal sequence B is received. After t=5119, a peak of cross-correlation with the known signal sequence a occurs at timing when the known signal sequence a or the inverse sequence −a is received.

Figure 7:
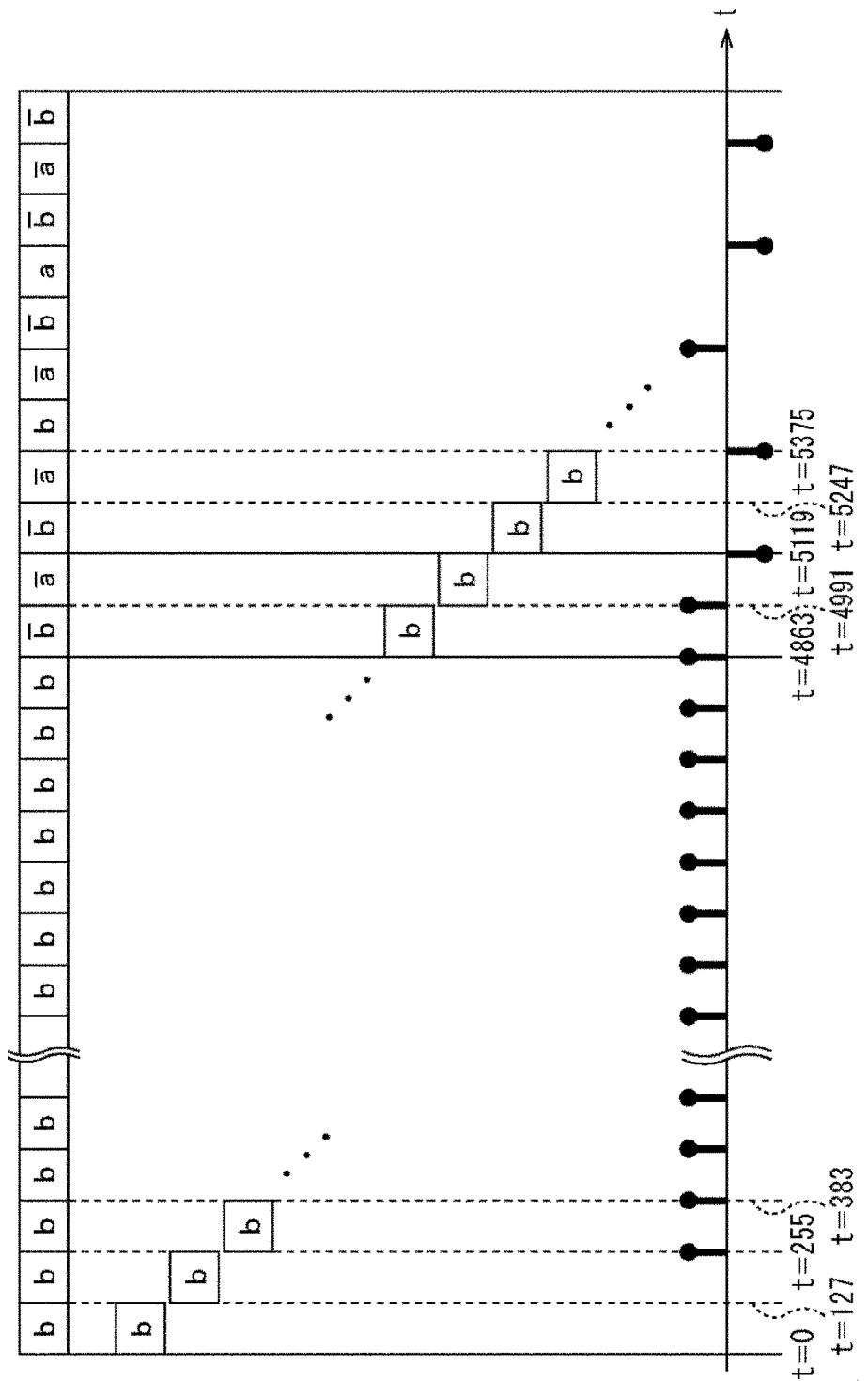
FIG. 7 is a diagram explaining cross-correlation between a received signal sequence and a known signal sequence b.

FIG. 7 is a diagram explaining cross-correlation between the received signal sequence r and the known signal sequence b.

A peak of cross-correlation between the received signal sequence r and the known signal sequence b occurs when 128 bits at time t correspond with the known signal sequence b.

Therefore, when cross-correlation is delayed by 128 time, a peak of positive cross-correlation occurs every 128 time during a period from t=255 128 time after t=127 when the known signal sequence b in the head of the frame detection signal sequence A is received to t=4991 128 time after t=4863 when the known signal sequence b in the last of the frame detection signal sequence A is received as illustrated in FIG. 7.

Furthermore, a peak of negative cross-correlation occurs at timing of t=5119 that is 128 time after t=4991 when the inverse sequence −b that forms the frame synchronization signal sequence B is received. After t=5119, a peak of cross-correlation with the known signal sequence b occurs at timing 128 time after time when the known signal sequence b or the inverse sequence −b is received.

Peak values illustrated on a first time axis from the top in FIG. 5 illustrate the peak values of cross-correlation $c^1_t$ between the received signal sequence r and the known signal sequence a described with reference to FIG. 6. Moreover, peak values illustrated on a second time axis from the top in FIG. 5 illustrate the peak values of cross-correlation $c^0_t$ between the received signal sequence r and the known signal sequence b described with reference to FIG. 7.

As in formula (18), a peak value of cross-correlation $y_t$ between the received signal sequence r and the frame synchronization signal sequence B at time t is represented by the cross-correlation $c^0_t$ and $c^1_t$ and thus occurs at timings illustrated on a third time axis from the top in FIG. 5.

Figure 8:
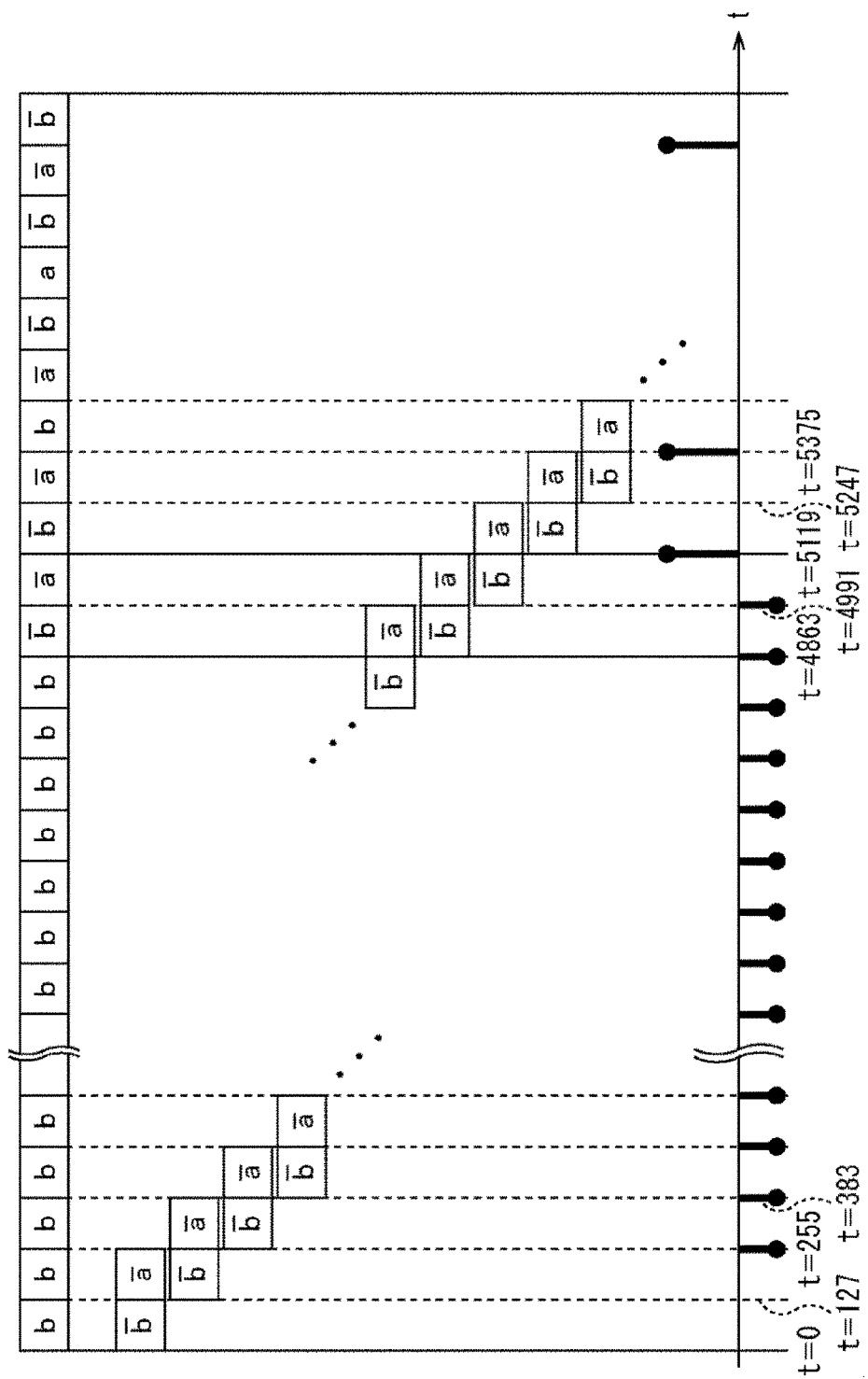
FIG. 8 is a diagram illustrating occurrence timing of a peak value of cross-correlation between a received signal sequence and a frame synchronization signal sequence B.

FIG. 8 is a diagram illustrating occurrence timing of a peak value of cross-correlation between the received signal sequence r and the frame synchronization signal sequence B.

A peak of negative cross-correlation occurs every 128 time during a period from t=255 128 time after t=127 when the known signal sequence b in the head of the frame detection signal sequence A is received to t=4991 128 time after t=4863 when the known signal sequence b in the last of the frame detection signal sequence A is received as illustrated in FIG. 8.

Further, at t=5119, a peak of cross-correlation of a doubled size, which is a sum of the peak of cross-correlation occurring upon reception of the inverse sequence −b and the peak of cross-correlation occurring upon reception of the inverse sequence −a subsequent to the inverse sequence −b, occurs. After t=5119, a peak of cross-correlation with the frame synchronization signal sequence B occurs at timing when the inverse sequence −a is received subsequent to the inverse sequence −b.

The receiver 2 derives likelihood information $z_t$ by performing convolution arithmetic operation of the known correlation sequence Q represented by the following formula (22) with a length S=2 and the cross-correlation $y_t$. Applying L=128 and S=2 to formula (11) results in likelihood information $z_t$ represented as in the following formula (23).

[Mathematical Formula 22]

$$Q=[q^0\ q^1]=[+1\ -1] \quad (22)$$

[Mathematical Formula 23]

$$z_t = y_t - y_{t-128} \quad (23)$$

As illustrated in formula (23), likelihood information $z_t$ is a difference derived by subtracting cross-correlation $y_t$ 128 time before from cross-correlation $y_t$ at time t. That is, likelihood information $z_t$ is obtained at timing illustrated on a fourth time axis from the top in FIG. 5. At timing t=5119, likelihood information $z_t$ is obtained with a size of a sum of the size of cross-correlation $y_t$ occurring at timing of t=4991 and the size of cross-correlation $y_t$ occurring at timing of t=5119.

The receiver 2 detects likelihood information $z_t$ more than or equal to a threshold value by comparing to the predetermined threshold value or detects the maximum likelihood information $z_t$. The receiver 2 performs frame synchronization by specifying that t=5119 when the likelihood information $z_t$ more than or equal to the threshold value or the maximum likelihood information $z_t$ is detected as reception time of the last bit of the frame synchronization signal sequence B.

The receiver 2 is enabled to enhance frame synchronization performance by performing frame synchronization on the basis of the likelihood information $z_t$ obtained in the above manner.

That is, the size of the likelihood information $z_t$ occurring at t=5119 corresponds to the sum of the size of the peak of cross-correlation $y_t$ occurring at t=5119 and the size of the peak of cross-correlation $y_t$ occurring at t=4991. Since frame synchronization is performed on the basis of signals of a wide dynamic range as compared to the case of using the peak of cross-correlation $y_t$ occurring at t=5119, undetection or false detection of a peak can be reduced, thereby allowing failure probability of frame synchronization to be reduced. Here, failure probability of frame synchronization is represented by "the number of false detection of a frame+the number of undetection of a frame."

Moreover, since a peak used for frame synchronization can be increased while the length of the frame synchronization signal sequence B is maintained at 256 bits, enhancement of frame synchronization performance can be implemented without reducing throughput.

Here, the known correlation sequence Q is determined by applying K=38, N=2, L=128, and S=2 to formula (14). The known correlation sequence Q is represented by the following formula (24).

[Mathematical Formula 24]

$$Q=[\mathrm{sgn}(X_{5119})\ \mathrm{sgn}(X_{4991})] \quad (24)$$

The aforementioned formula (12) is equivalent to formula (7) an element $r_t$ of the received signal sequence of which is replaced with an element $g_t$ of the preamble sequence. Thus, a sign of the peak of cross-correlation $x_t$ at t=5119 represented by $\mathrm{sgn}(x_{5119})$ is +1 and a sign of the peak of cross-correlation $x_t$ at t=4991 represented by $\mathrm{sgn}(x_{4991})$ is −1 as illustrated on the third time axis from the top in FIG. 5. With these, the known correlation sequence Q in the above formula (22) is derived.

<<4. Configuration and Operation of Receiver>>

Next, a configuration and operation of the receiver 2 that performs frame synchronization in the above manner will be described.

Figure 9:
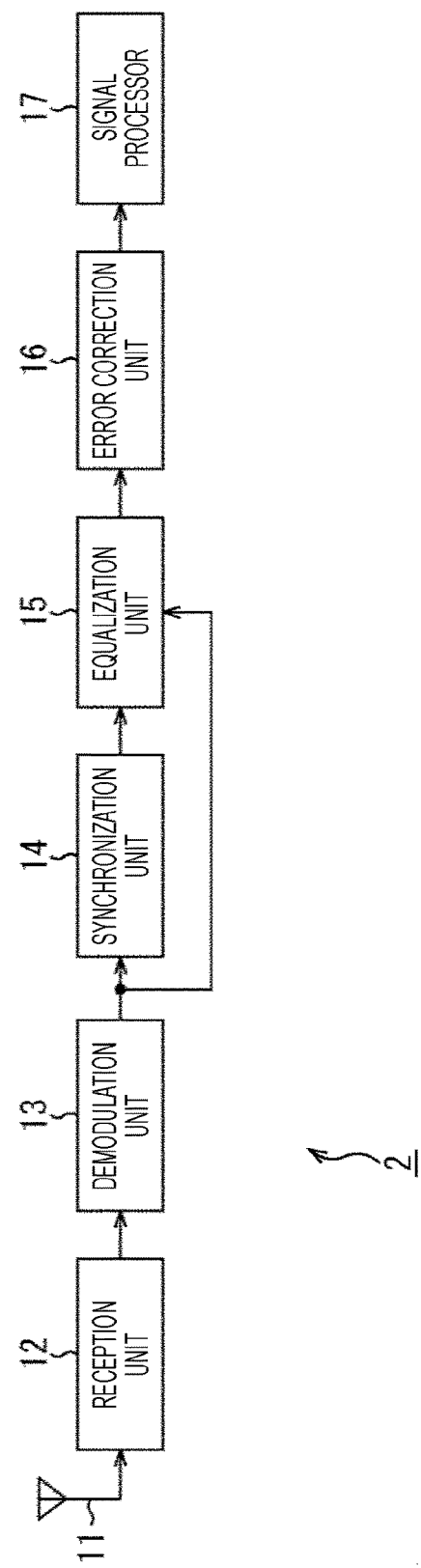
FIG. 9 is a block diagram illustrating an exemplary configuration of a receiver.

FIG. 9 is a block diagram illustrating an exemplary configuration of the receiver 2.

The receiver 2 includes a reception antenna 11, a reception unit 12, a demodulation unit 13, a synchronization unit 14, an equalization unit 15, an error correction unit 16, and a signal processor 17. A transmission signal transmitted from the transmitter 1 is received by the reception antenna 11 and input to the reception unit 12 as an RF signal.

The reception unit 12 converts the RF signal supplied from the reception antenna 11 into an analog baseband signal, performs various processing such as adjustment of signal levels, band limitation, and A/D conversion, and thereby outputs.

The demodulation unit 13 demodulates a received symbol according to a demodulation system corresponding to a modulation system in the transmitter 1 and then outputs a signal sequence of the received symbol. The signal sequence output from the demodulation unit 13 is supplied to the synchronization unit 14 and the equalization unit 15.

The synchronization unit 14 performs frame synchronization in the manner as described above and outputs a signal representing reception time of the last bit of the inverse sequence −a that forms the frame synchronization signal sequence B.

The equalization unit 15 performs channel estimation using the channel estimation signal sequence C subsequent to the last inverse sequence −a in the frame synchronization signal sequence B detected by the synchronization unit 14 and performs equalization processing on the signal supplied from the demodulation unit 13. The equalization unit 15 outputs data of a header and a payload obtained by performing equalization processing to the error correction unit 16.

The error correction unit 16 performs error correction on the data supplied from the equalization unit 15 and outputs data after error correction.

The signal processor 17 acquires the data after error correction transmitted from the transmitter 1 and performs various processing. For example, when current transmission data is AV data, the signal processor 17 outputs the AV data to a display device (not illustrated) to display an image on a display or to output sound from a speaker.

<4-1. First Exemplary Configuration of Synchronization Unit>

Figure 10:
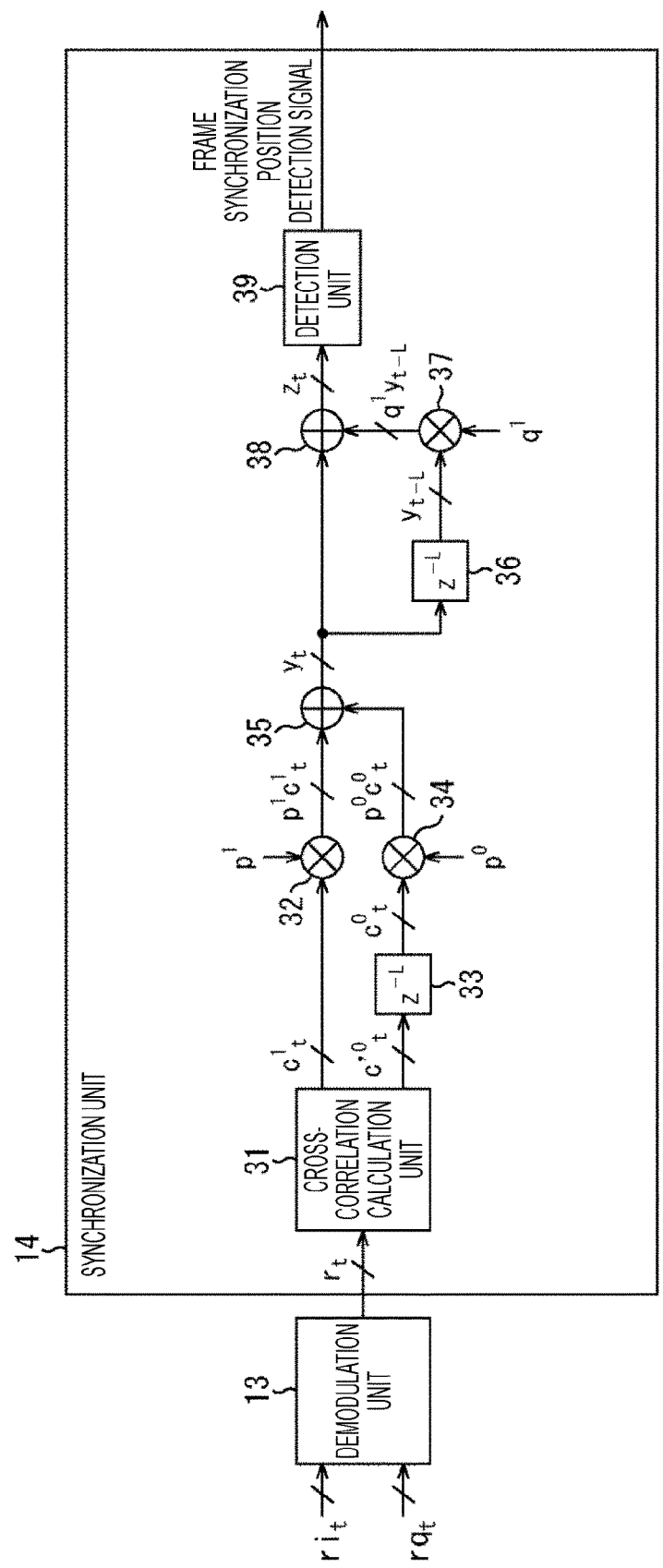
FIG. 10 is a diagram illustrating a first exemplary configuration of a synchronization unit.

FIG. 10 is a diagram illustrating an exemplary configuration of the synchronization unit 14.

The synchronization unit 14 includes a cross-correlation calculation unit 31, a multiplication unit 32, a delay unit 33, a multiplication unit 34, an addition unit 35, a delay unit 36, a multiplication unit 37, an addition unit 38, and a detection unit 39. The synchronization unit 14 is input with a received signal $r_t$ obtained by demodulating, by the demodulation unit 13, received complex signals $ri_t$ and $rq_t$ at time t.

The cross-correlation calculation unit 31 calculates and outputs cross-correlation $c^1_t$ and $c^0_t$ between the received signal $r_t$ and each of the known signal sequences a and b at time t. A signal representing the cross-correlation $c^1_t$ output from the cross-correlation calculation unit 31 is supplied to the multiplication unit 32 and a signal representing the cross-correlation $c'^0_t$ is supplied to the delay unit 33.

The multiplication unit 32 multiplies the cross-correlation $c^1_t$ by an element $p^1$ of the spreading code sequence P and outputs a signal representing the multiplication result to the addition unit 35. In the above example, $p^1=-1$ is preset.

The delay unit 33 delays the cross-correlation $c'^0_t$ by L time and outputs a signal representing the delayed $c^0_t$ to the multiplication unit 34. In the above example, L=128 holds.

The multiplication unit 34 multiplies the cross-correlation $c^0_t$ by an element $p^0$ of the spreading code sequence P and outputs a signal representing the multiplication result to the addition unit 35. In the above example, $p^0=-1$ is preset.

The addition unit 35 adds $p^1c^1_t$ derived by the multiplication unit 32 and $p^0c^0_t$ derived by the multiplication unit 34 and outputs the addition result. The addition result derived here is equivalent to the cross-correlation $y_t$ between the received signal sequence r and the frame synchronization signal sequence B at time t. A signal representing the cross-correlation $y_t$ output from the addition unit 35 is supplied to the delay unit 36 and the addition unit 38.

The delay unit 36 delays the cross-correlation $y_t$ by L time and outputs a signal representing the delayed cross-correlation $y_{t-L}$ to the multiplication unit 37.

The multiplication unit 37 multiplies the cross-correlation $y_{t-L}$ by an element $q^1$ of the known correlation sequence Q and outputs a signal representing the multiplication result to the addition unit 38. In the above example, $q^1=-1$ is preset.

The addition unit 38 adds the cross-correlation $y_t$ supplied from the addition unit 35 and the multiplication result of the cross-correlation $y_{t-L}$ and the element $q^1$ of the known correlation sequence Q supplied from the multiplication unit 37 for output. Illustration of a configuration for performing multiplication is omitted since $q^0=+1$ holds. The cross-correlation $y_t$ supplied to the addition unit 38 corresponds to a multiplication result of the cross-correlation $y_t$ and an element $q^0=+1$ of the known correlation sequence Q.

The addition result derived in the addition unit 38 is equivalent to likelihood information $z_t$ at time t. A signal representing the likelihood information $z_t$ output from the addition unit 38 is supplied to the detection unit 39.

The detection unit 39 detects the likelihood information $z_t$ more than or equal to a threshold value by comparing to the predetermined threshold value or detects the maximum likelihood information $z_t$.

The detection unit 39 specifies time when the likelihood information $z_t$ more than or equal to the threshold value or the maximum likelihood information $z_t$ is detected as reception time of the last bit of the frame synchronization signal sequence B and outputs a frame synchronization position detection signal that is a signal representing the specified time. The frame synchronization position detection signal output from the detection unit 39 is supplied to the equalization unit 15 and used for equalization processing.

<4-2. Processing by Receiver>

Figure 11:
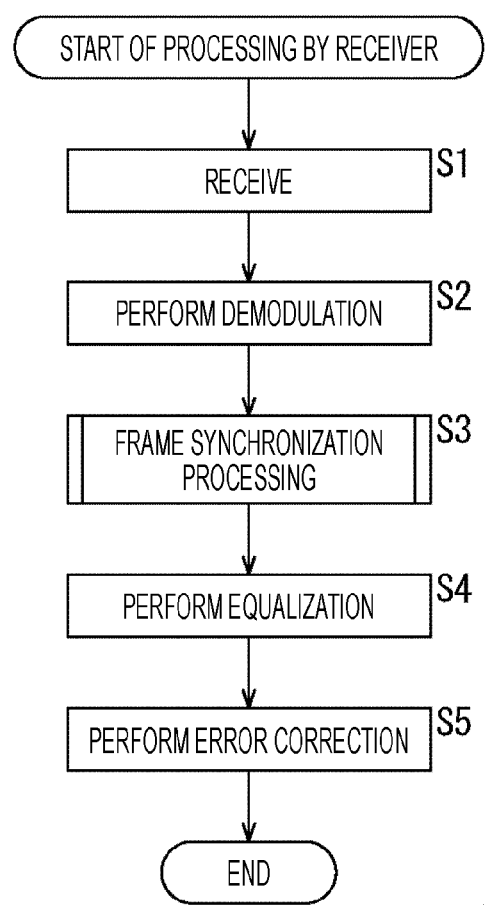
FIG. 11 is a flowchart explaining reception processing of a receiver.

Next, processing by the receiver 2 having a configuration as described above will be described with reference to a flowchart in FIG. 11.

In step S1, the reception unit 12 receives the RF signal supplied from the reception antenna 11 and performs various processing such as conversion processing into an analog baseband signal.

In step S2, the demodulation unit 13 demodulates a received symbol according to a demodulation system corresponding to a modulation system in the transmitter 1.

In step S3, the synchronization unit 14 performs frame synchronization processing. The frame synchronization processing will be described later with reference to a flowchart in FIG. 12.

In step S4, the equalization unit 15 specifies the channel estimation signal sequence C in the preamble according to the frame synchronization position detection signal supplied from the synchronization unit 14 and performs equalization processing including channel estimation.

In step S5, the error correction unit 16 performs error correction on data and outputs data after error correction. The above processing is repeated during a period in which data is transmitted from the transmitter 1. When transmission of data is terminated, the receiver 2 terminates processing.

Next, the frame synchronization processing performed in step S3 in FIG. 11 will be described with reference to a flowchart in FIG. 12.

In step S11, the cross-correlation calculation unit 31 calculates the cross-correlation $c^1_t$ between the received signal $r_t$ and the known signal sequence a at time t.

In step S12, the cross-correlation calculation unit 31 calculates the cross-correlation $c'^0_t$ between the received signal $r_t$ and the known signal sequence b at time t.

In step S13, the multiplication unit 32 multiplies the cross-correlation $c^1_t$ by an element $p^1$ of the spreading code sequence P.

In step S14, the delay unit 33 delays the cross-correlation $c'^0_t$ by L time and outputs a signal representing the cross-correlation $c^0_t$.

In step S15, the multiplication unit 34 multiplies the cross-correlation $c^0_t$ by an element $p^0$ of the spreading code sequence P.

In step S16, the addition unit 35 adds the multiplication results $p^1c^1_t$ and $p^0c^0_t$ and outputs the addition result as the cross-correlation $y_t$.

In step S17, the delay unit 36 delays the cross-correlation $y_t$ by L time and outputs a signal representing the cross-correlation $y_{t-L}$.

In step S18, the multiplication unit 37 multiplies the cross-correlation $q_{t-L}$, which is the delayed cross-correlation $y_t$, by an element $q^1$ of the known correlation sequence Q.

In step S19, the addition unit 38 adds the multiplication result $q^0y_t$ of the cross-correlation $y_t$ and an element $q^0(q^0=+1)$ of the known correlation sequence Q and the multiplication result $q^1y_{t-L}$ of the cross-correlation $y_{t-L}$ and an element $q^1(q^1=-1)$ of the known correlation sequence Q. The addition unit 38 outputs the addition result as the likelihood information $z_t$.

In step S20, the detection unit 39 detects the likelihood information $z_t$ more than or equal to a predetermined threshold value or detects the maximum likelihood information $z_t$. The detection unit 39 specifies time when the likelihood information $z_t$ more than or equal to the threshold value or the maximum likelihood information $z_t$ is detected as reception time of the last bit of the frame synchronization signal sequence B and outputs a frame synchronization position detection signal. Thereafter, the flow returns to step S3 in FIG. 11 and subsequent processing is performed.

The above series of processing allows the receiver 2 to enhance frame synchronization performance without reducing throughput.

<4-3. Second Exemplary Configuration of Synchronization Unit>

Figure 13:
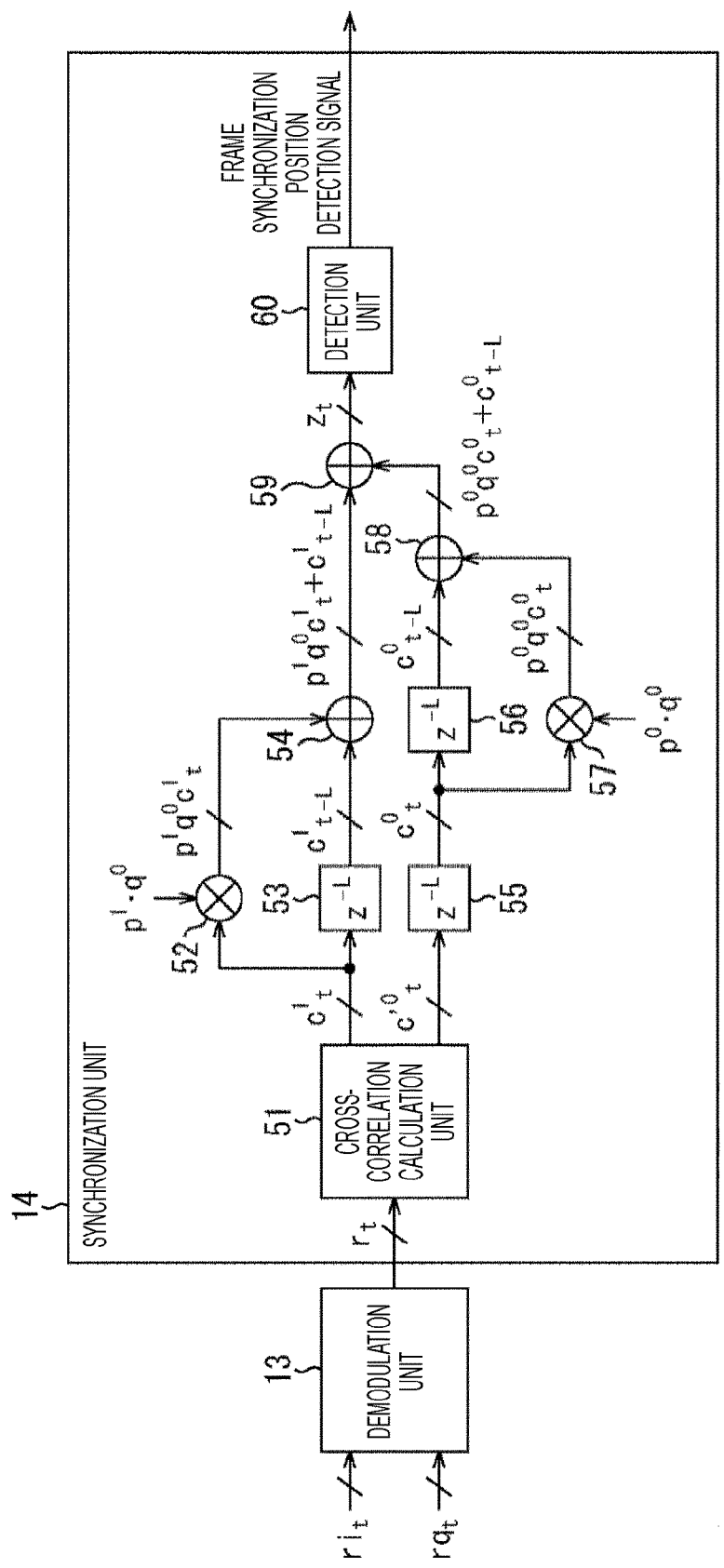
FIG. 13 is a diagram illustrating a second exemplary configuration of a synchronization unit.

FIG. 13 is a diagram illustrating a second exemplary configuration of the synchronization unit 14.

Explanation will be given on that frame synchronization using the likelihood information $z_t$ can also be implemented by a configuration in FIG. 13. It is assumed that the number of known signal sequences that forms the frame synchronization signal sequence B is N=2 and the length of the known correlation sequence Q is S=2.

Substituting N=2 and S=2 and thereby developing results in formula (9) to be represented by the following formula (25).

[Mathematical Formula 25]

$$y_t = \sum_{l=0}^{1} p^l c_t^l \quad (25)$$
$$= p^0 c_t^0 + p^1 c_t^1$$

Further, substituting N=2 and S=2 and thereby developing results in formula (11) to be represented by the following formula (26).

[Mathematical Formula 26]

$$z_t = \sum_{k=0}^{1} q^k y_{t-k \cdot L} \quad (26)$$
$$= q^0 y_t + q^1 y_{t-L}$$

Next, substituting t−L for t results in formula (25) to be represented by formula (27). [Mathematical Formula 27]

$$y_{t-L} = p^0 c_{t-L}^0 + p^1 c_{t-L}^1 \quad (27)$$

Substituting formula (25) and formula (27) results in formula (26) representing the likelihood information $z_t$ is represented by the following formula (28).

[Mathematical Formula 28]

$$z_t = q^0(p^0 c_t^0 + p^1 c_t^1) + q^1(p^0 c_{t-L}^0 + p^1 c_{t-L}^1) \quad (28)$$
$$= p^0 q^0 c_t^0 + p^1 q^0 c_t^1 + p^0 q^1 c_{t-L}^0 + p^1 q^1 c_{t-L}^1$$

The configuration of the synchronization unit 14 illustrated in FIG. 13 implements calculation of formula (28).

As illustrated in FIG. 13, the synchronization unit 14 includes a cross-correlation calculation unit 51, a multiplication unit 52, a delay unit 53, a multiplication unit 54, a delay unit 55, a delay unit 56, a multiplication unit 57, an addition unit 58, an addition unit 59, and a detection unit 60. The synchronization unit 14 is input with a received signal $r_t$ obtained by demodulating, by the demodulation unit 13, received complex signals $ri_t$ and $rq_t$ at time t.

The cross-correlation calculation unit 51 calculates and outputs cross-correlation $c^1_t$ and $c'^0_t$ between the received signal $r_t$ and each of the known signal sequences a and b at time t. A signal representing the cross-correlation $c^1_t$ output from the cross-correlation calculation unit 51 is supplied to the multiplication unit 52 and the delay unit 53 and a signal representing the cross-correlation $c'^0_t$ is supplied to the delay unit 55.

The multiplication unit 52 multiplies the cross-correlation $c^1_t$ by $p^1 \cdot q^0$ and outputs a signal representing the multiplication result to the addition unit 54. In the above example, the element of the spreading code sequence P is preset as $p^1 = -1$ and the element of the known correlation sequence Q is preset as $q^0 = +1$.

The delay unit 53 delays the cross-correlation $c^1_t$ by L time and outputs a signal representing the delayed $c^1_{t-L}$ to the addition unit 54. In the above example, L=128 holds. Here, in order to implement calculation of the above formula (28), it is required that the delayed cross-correlation $c^1_{t-L}$ is multiplied by $p^1 \cdot q^1$. In the case of the above example, however, an element of the spreading code sequence P is $p^1 = -1$ and an element of the known correlation sequence Q is $q^1 = -1$ and thus $p^1 \cdot q^1 = 1$ holds. Therefore, such operation is unnecessary.

The addition unit 54 adds $p^1 q^0 c^1_t$ derived by the multiplication unit 52 and the cross-correlation $c^1_{t-L}$ supplied from the delay unit 53 and outputs the addition result to the addition unit 59. The addition result derived here corresponds to the addition result of the second term and the fourth term in formula (28).

Meanwhile, the delay unit 55 delays the cross-correlation $c'^0_t$ by L time and outputs a signal representing the delayed $c^0_t$. In the above example, L=128 holds. The signal representing the cross-correlation $c^0_t$ output from the delay unit 55 is supplied to the delay unit 56 and the multiplication unit 57.

The delay unit 56 delays the cross-correlation $c^0_t$ by L time and outputs a signal representing the delayed $c^0_{t-L}$ to the addition unit 58. In the above example, L=128 holds. Here, in order to implement calculation of the above formula (28), it is required that the delayed cross-correlation $c^0_{t-L}$ is multiplied by $p^0 \cdot q^1$. In the case of the above example, however, an element of the spreading code sequence P is $p^0 = -1$ and an element of the known correlation sequence Q is $q^1 = -1$ and thus $p^0 \cdot q^1 = 1$ holds. Therefore, such operation is unnecessary.

The multiplication unit 57 multiplies the cross-correlation $c^0_t$ by $p^0 \cdot q^0$ and outputs a signal representing the multiplication result to the addition unit 58. In the above example, the element of the spreading code sequence P is preset as $p^0 = -1$ and the element of the known correlation sequence Q is preset as $q^0 = +1$.

The addition unit 58 adds the cross-correlation $c^0_{t-L}$ supplied from the delay unit 56 and $p^0 q^0 c^0_t$ derived by the multiplication unit 57 and outputs the addition result to the addition unit 59. The addition result derived here corresponds to the addition result of the first term and the third term in formula (28).

The addition unit 59 adds $p^1 q^0 c^1_t + c^1_{t-L}$ supplied from the addition unit 54 and $p^0 q^0 c^0_t + c^0_{t-L}$ supplied from the addition unit 58 and outputs the addition result to the detection unit 60. The addition result derived here is equivalent to the likelihood information $z_t$ at time t represented by formula (28).

The detection unit 60 detects the likelihood information $z_t$ more than or equal to a threshold value by comparing to the predetermined threshold value or detects the maximum likelihood information $z_t$.

The detection unit 60 specifies time when the likelihood information $z_t$ more than or equal to the threshold value or the maximum likelihood information $z_t$ is detected as reception time of the last bit of the frame synchronization signal sequence B and outputs a frame synchronization position detection signal representing the specified time. The frame synchronization position detection signal output from the detection unit 60 is supplied to the equalization unit 15 and used for equalization processing.

The receiver 2 can obtain the likelihood information $z_t$ also with the configuration in FIG. 13 and can further enhance frame synchronization performance without reducing throughput by performing frame synchronization using the likelihood information $z_t$.

<4-4. Third Exemplary Configuration of Synchronization Unit>

Figure 14:
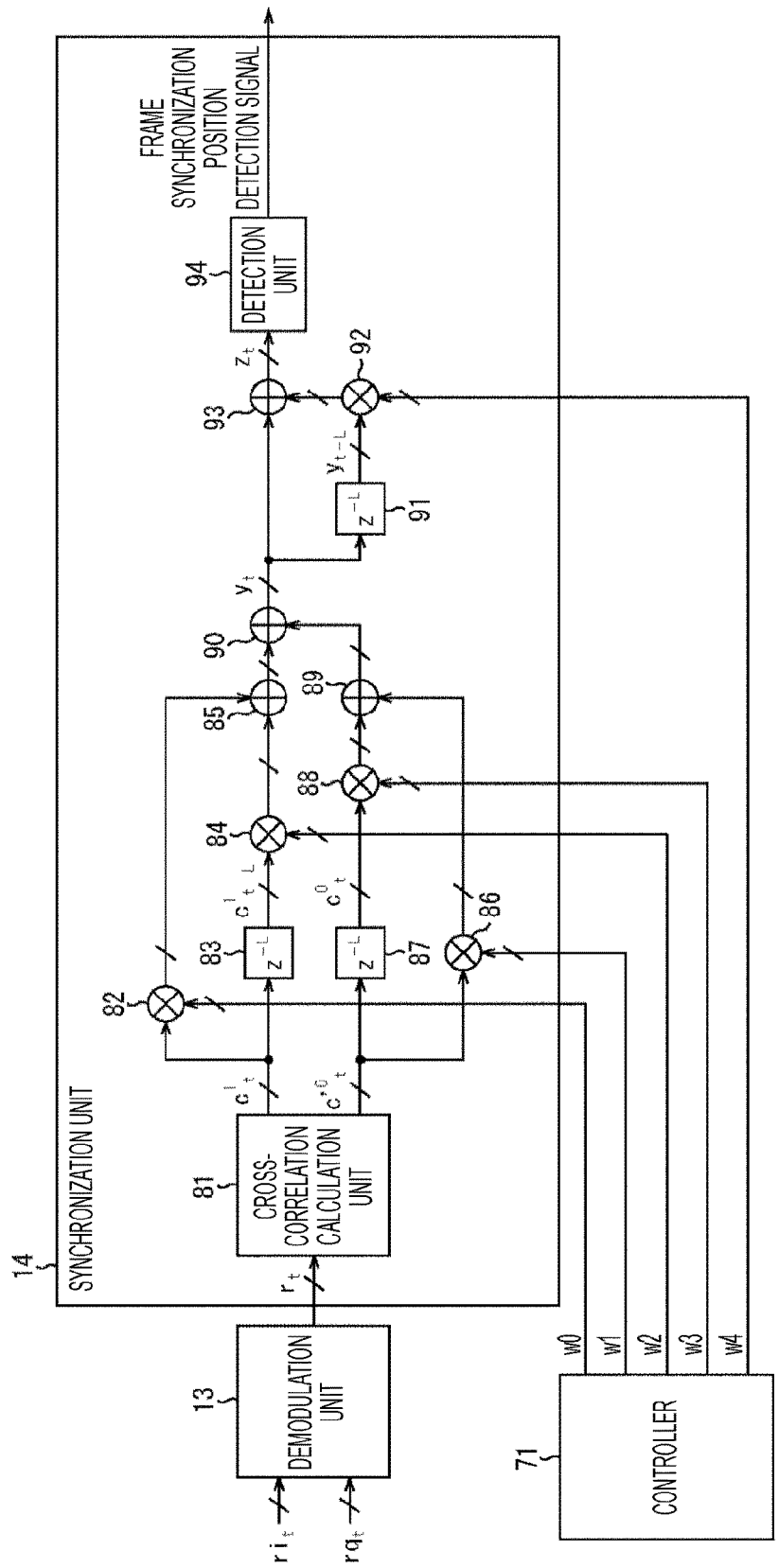
FIG. 14 is a diagram illustrating a third exemplary configuration of a synchronization unit.

FIG. 14 is a diagram illustrating a third exemplary configuration of the synchronization unit 14.

Also in this example, it is assumed that the number of known signal sequences that forms the frame synchronization signal sequence B is N=2 and the length of the known correlation sequence Q is S=2.

As illustrated in FIG. 14, the synchronization unit 14 includes a cross-correlation calculation unit 81, a multiplication unit 82, a delay unit 83, a multiplication unit 84, an addition unit 85, a multiplication unit 86, a delay unit 87, a multiplication unit 88, an addition unit 89, an addition unit 90, a delay unit 91, a multiplication unit 92, an addition unit 93, and a detection unit 94. In this case, the receiver 2 includes a controller 71 externally to the synchronization unit 14.

The controller 71 includes a central processing unit (CPU), a read only memory (ROM), a random access memory (RAM), and other units. The controller 71 controls the frame synchronization processing in the synchronization unit 14 by executing a predetermined program. The controller 71 can be configured by hardware. The controller 71 sets coefficients w0, w1, w2, w3, and w4 to the multiplication unit 82, the multiplication unit 86, the multiplication unit 84, the multiplication unit 88, and the multiplication unit 92, respectively.

The synchronization unit 14 is input with a received signal $r_t$ obtained by demodulating, by the demodulation unit 13, received complex signals $ri_t$ and $rq_t$ at time t.

The cross-correlation calculation unit 81 calculates and outputs cross-correlation $c^1_t$ and $c^{i0}_t$ between the received signal $r_t$ and each of the known signal sequences a and b at time t. A signal representing the cross-correlation $c^1_t$ output from the cross-correlation calculation unit 81 is supplied to the multiplication unit 82 and the delay unit 83 and a signal representing the cross-correlation $c^{i0}_t$ is supplied to the multiplication unit 86 and the delay unit 87.

The multiplication unit 82 multiplies the cross-correlation $c^1_t$ by the coefficient w0 set by the controller 71 and outputs a signal representing the multiplication result to the addition unit 85.

The delay unit 83 delays the cross-correlation $c^1_t$ by L time and outputs a signal representing the delayed $c^1_{t-L}$ to the multiplication unit 84. In the above example, L=128 holds.

The multiplication unit 84 multiplies the cross-correlation $c^1_{t-L}$ by the coefficient w2 set by the controller 71 and outputs a signal representing the multiplication result to the addition unit 85.

The addition unit 85 adds $w0 \cdot c^1_t$ derived by the multiplication unit 82 and $w2 \cdot c^1_{t-L}$ derived by the multiplication unit 84 and outputs the addition result to the addition unit 90.

The multiplication unit 86 multiplies the cross-correlation $c^{i0}_t$ by the coefficient w1 set by the controller 71 and outputs a signal representing the multiplication result to the addition unit 89.

The delay unit 87 delays the cross-correlation $c^{i0}_t$ by L time and outputs a signal representing the delayed $c^{i0}_{t-L}$ to the multiplication unit 88. In the above example, L=128 holds.

The multiplication unit 88 multiplies the cross-correlation $c^{i0}_t$ by the coefficient w3 set by the controller 71 and outputs a signal representing the multiplication result to the addition unit 89.

The addition unit 89 adds $w1 \cdot c^{i0}_t$ derived by the multiplication unit 86 and $w3 \cdot c^{i0}_t$ derived by the multiplication unit 88 and outputs the addition result to the addition unit 90.

The addition unit 90 adds $w0 \cdot c^1_t + w2 \cdot c^1_{t-L}$ which is the addition result derived by the addition unit 85 and $w1 \cdot c^{i0}_t + w3 \cdot c^{i0}_t$ which is the addition result derived by the addition unit 89. Here, the controller 71 sets the coefficients w0, w1, w2, and w3 such that the addition result by the addition unit 90 is equivalent to the cross-correlation $y_t$.

That is, when the preamble of IEEE 802.11ad is the current preamble, the cross-correlation $y_t$ is represented by formula (18) since N=2 holds and the spreading code sequence P is represented by formula (16). The controller 71 sets w0=−1, w1=0, w2=0, and w3=−1.

The addition unit 90 outputs a signal representing the cross-correlation $y_t$ that is the addition result. A signal representing the addition result output from the addition unit 90 is supplied to the delay unit 91 and the addition unit 93.

The delay unit 91 delays the cross-correlation $y_t$ by L time and outputs a signal representing the delayed cross-correlation $y_{t-L}$ to the multiplication unit 92. In the above example, L=128 holds.

The multiplication unit 92 multiplies the cross-correlation $y_{t-L}$ by the coefficient w4 set by the controller 71 and outputs a signal representing the multiplication result to the addition unit 93. Here, the controller 71 sets the coefficient w4 such that the addition result of the cross-correlation $y_t$ and the multiplication result $w4 \cdot y_{t-L}$ by the multiplication unit 92 is equivalent to the likelihood information $z_t$.

That is, when the preamble of IEEE 802.11ad is the current preamble, the likelihood information $z_t$ is represented by formula (23) and thus the controller 71 sets w4=−1.

The addition unit 93 adds the cross-correlation $y_t$ derived by the addition unit 90 and $w4 \cdot y_{t-L}$ which is the multiplication result by the multiplication unit 92 and outputs a signal representing the likelihood information $z_t$ to the detection unit 94.

The detection unit 94 detects the likelihood information $z_t$ more than or equal to a threshold value by comparing to the predetermined threshold value or detects the maximum likelihood information $z_t$.

The detection unit 94 specifies time when the likelihood information $z_t$ more than or equal to the threshold value or the maximum likelihood information $z_t$ is detected as reception time of the last bit of the frame synchronization signal sequence B and outputs a frame synchronization position detection signal representing the specified time. The frame synchronization position detection signal output from the detection unit 94 is supplied to the equalization unit 15 and used for equalization processing.

The receiver 2 can also derive the likelihood information $z_t$ by regarding the coefficient as variable and setting a predetermined coefficient. The receiver 2 can further enhance frame synchronization performance without reducing throughput by performing frame synchronization using the likelihood information $z_t$.

<<<5. Exemplary Application to Other Preambles>>>
<Exemplary Application to SC PHY Preamble of IEEE 802.11ad>

About Preamble Structure

Figure 12:
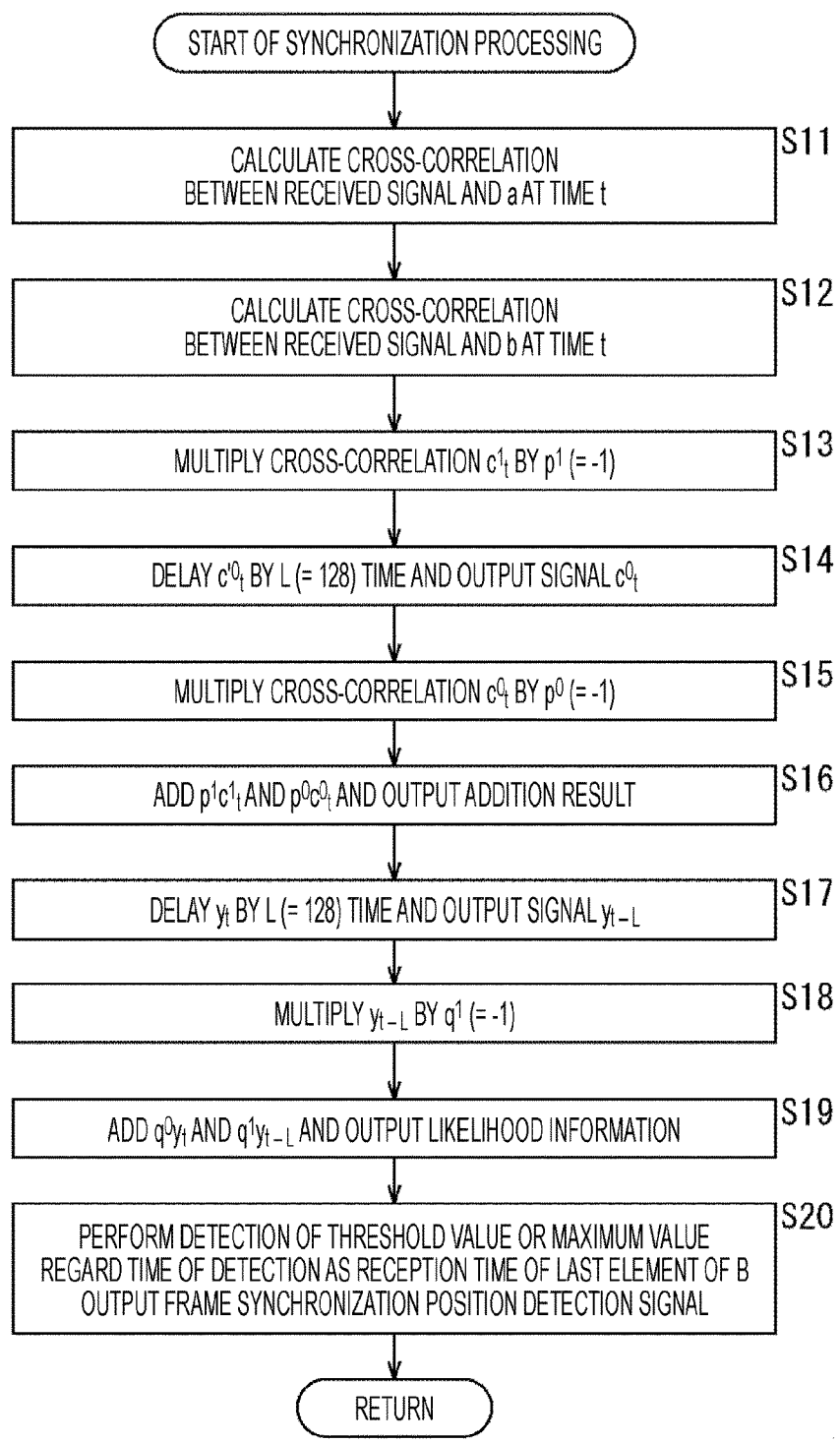
FIG. 12 is a flowchart explaining frame synchronization processing performed in step S3 in FIG. 11.

The case of performing frame synchronization using the control PHY preamble of IEEE 802.11.ad has been mainly described; however, the frame synchronization processing in FIG. 12 can be applied to processing of any preamble including the frame detection signal sequence A and the frame synchronization signal sequence B.

For example, the receiver 2 can perform the frame synchronization processing in FIG. 12 using a single carrier (SC) PHY preamble of IEEE 802.11ad.

Figure 15:
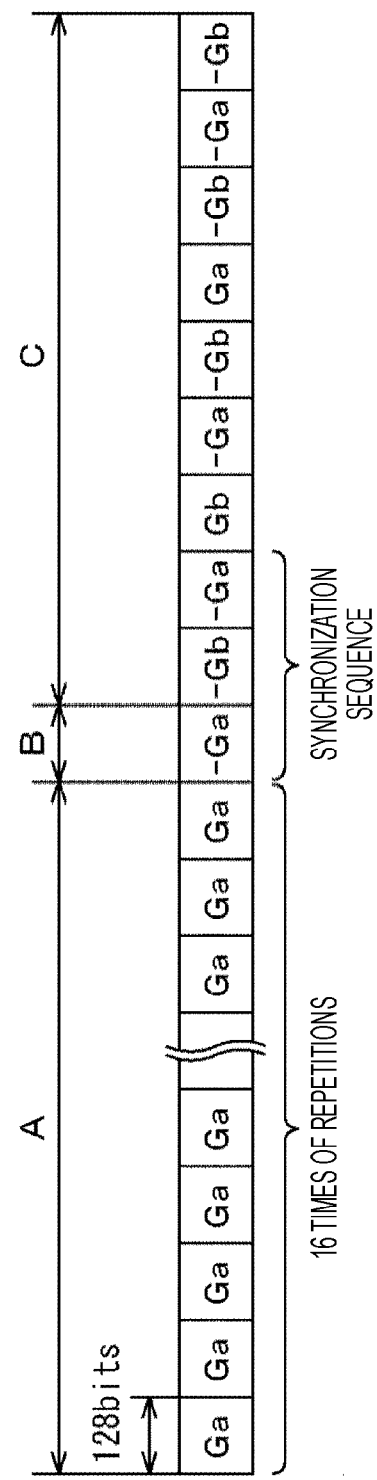
FIG. 15 is a diagram illustrating a structure of a SC PHY preamble of IEEE 802.11ad.

FIG. 15 is a diagram illustrating a structure of a SC PHY preamble of IEEE 802.11ad.

The SC PHY preamble of IEEE 802.11ad is defined by the following Non-Patent Document 1 for example.

Non-Patent Document 1 Wireless LAN Medium Access Control (MAC) and Physical Layer (PHY) Specifications: Enhancements for Very High Throughput in the 60 GHz Band," IEEE Std 802.11ad-2012

The SC PHY preamble of IEEE 802.11ad includes known signal sequences {Ga, Gb} of Golay complementary sequences with a length of 128 symbols (128 bits) and inverse sequences {−Ga, −Gb} that are bit inverse sequences of the known signal sequences a and b, respectively. An inverse sequence of the SC PHY preamble of IEEE 802.11ad is denoted with a sign "−."

The SC PHY preamble of IEEE 802.11ad is divided into the frame detection signal sequence A, the frame synchronization signal sequence B, and the channel estimation signal sequence C.

The frame detection signal sequence A is 16 times of repetitions of the known signal sequence Ga. The frame detection signal sequence A is represented by the following formula (29).

[Mathematical Formula 29]

$$A=[Ga\ Ga\ Ga\ Ga\ Ga\ Ga\ Ga\ \ldots\ Ga\ Ga\ Ga] \quad (29)$$

The frame synchronization signal sequence B includes the inverse sequence −Ga. The frame synchronization signal sequence B is represented by the following formula (30).

[Mathematical Formula 30]

$$B=[-Ga] \quad (30)$$

The channel estimation signal sequence C includes the known signal sequences Ga and Gb and the inverse sequences −Ga and −Gb. The channel estimation signal sequence C is represented by the following formula (31).

[Mathematical Formula 31]

$$C=[-Gb\ -Ga\ Gb\ -Ga\ -Gb\ Ga\ -Gb\ -Ga\ -Gb] \quad (31)$$

As described above, the receiver 2 performs convolution arithmetic operation of a cross-correlation value between the received signal sequence and the synchronization sequence and the known signal sequence, compares the likelihood information that is a calculation result to a threshold value, and thereby performs frame synchronization. Here, an exemplary case is explained where the receiver 2 performs frame synchronization using, as a synchronization sequence, a signal sequence that has a length of 3 L and includes the inverse sequence −Ga of the frame synchronization signal sequence B and leading two inverse sequences −Gb and −Ga of the channel estimation signal sequence C as illustrated in FIG. 15.

Generally, which signal sequence to use as the synchronization sequence depends on implementation. In this example, the receiver 2 performs frame synchronization using, as the synchronization sequence, the frame synchronization signal sequence B and leading two known signal sequences of the channel estimation signal sequence C.

Figure 16:
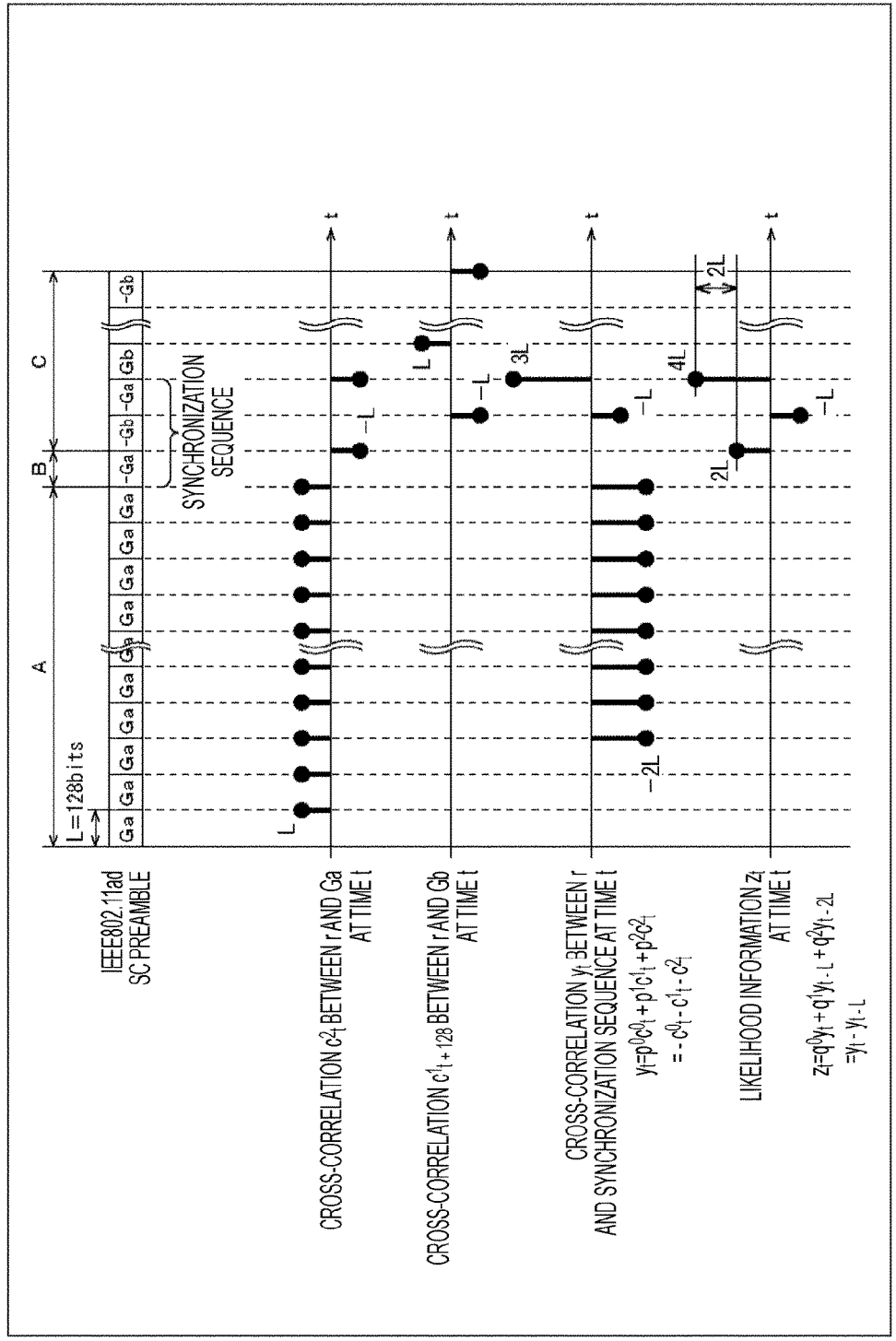
FIG. 16 is a diagram schematically illustrating frame synchronization processing using a SC PHY preamble of IEEE 802.11ad.

FIG. 16 is a diagram schematically illustrating the frame synchronization processing in FIG. 12 using the SC PHY preamble of IEEE 802.11ad.

In FIG. 16, the number of known signal sequences N, the known signal sequence D, the spreading code sequence P, a frame synchronization signal sequence B', and the known correlation sequence Q are expressed as in the following.

$$N=3$$

$$D=[d^0\ d^1\ d^2]=[Ga\ Gb\ Ga]$$

$$P=[p^0\ p^1\ p^2]=[-1\ -1\ -1]$$

$$B'=[p^0 d^0\ p^1 d^1\ p^2 d^2]=[-Ga\ -Gb\ -Ga]$$

$$Q=[q^0\ q^1\ q^2]=[+1\ -1\ 0]$$

A first time axis from the top in FIG. 16 illustrates a peak of cross-correlation between the received signal sequence r and the known signal sequence Ga at time t. As illustrated in FIG. 16, every time the known signal sequence Ga is received as the received signal sequence r, a peak of a peak value L occurs. Furthermore, every time the inverse sequence −Ga is received as the received signal sequence r, a peak of a peak value −L occurs.

Specifically, a peak of peak value L occurs every other 128 time during a period from 128 time after a reference, which is the head of the frame detection signal sequence A, to time of the last bit of the frame detection signal sequence A. A peak of peak value −L further occurs at time of the last bit of the frame synchronization signal sequence B and 256 time thereafter.

The peak value being L means that 128 bits received immediately before time when the peak of the peak value L has occurred entirely correspond with 128 bits of a signal sequence (e.g. the known signal sequence Ga) that serves as a reference for deriving cross-correlation. The peak value being −L means that 128 bits received immediately before time when the peak of the peak value −L has occurred do not entirely correspond with 128 bits of a signal sequence that serves as a reference for deriving cross-correlation.

A second time axis from the top in FIG. 16 illustrates a peak of cross-correlation between the received signal sequence r and the known signal sequence Gb at time t. As illustrated in FIG. 16, every time the known signal sequence Gb is received as the received signal sequence r, a peak of peak value L occurs. Furthermore, every time the inverse sequence −Gb is received as the received signal sequence r, a peak of peak value −L occurs.

A peak of peak value −L occurs 128 time after a reference, which is time of the last bit of the frame synchronization signal sequence B. A peak of peak value L further occurs 256 time thereafter.

A third time axis from the top in FIG. 16 illustrates a peak of cross-correlation between the received signal sequence r and a synchronization sequence [−Ga −Gb −Ga] at time t. As illustrated in FIG. 16, a peak of peak value −2L occurs 384 time after a reference, which is the head of the frame detection signal sequence A. Thereafter, a peak of peak value −2L occurs every other 128 time until time of the last bit of the frame detection signal sequence A. A peak of peak value −L further occurs 128 time after time of the last bit of the frame synchronization signal sequence B and a peak of peak value 3L occurs 128 time thereafter.

A fourth time axis from the top in FIG. 16 illustrates a peak of likelihood information at time t. The likelihood information is a result of convolution arithmetic operation of the cross-correlation illustrated on the third time axis from the top and the known correlation sequence Q. The known correlation sequence Q is predetermined on the basis of a peak value of cross-correlation between a signal sequence and a synchronization sequence that form the whole preamble (formula (10)).

As illustrated in FIG. 16, peak of peak value 2L occurs at time of the last bit of the frame synchronization signal sequence B and a peak of peak value −L occurs 128 time thereafter. A peak of peak value 4L further occurs 256 time after time of the last bit of the frame synchronization signal sequence B.

The receiver 2 compares the peak value of convolution cross-correlation derived in the above manner to a threshold value and performs frame synchronization by detecting a peak value more than or equal to the threshold value or by detecting the maximum peak value.

About Configuration of Synchronization Unit

Figure 17:
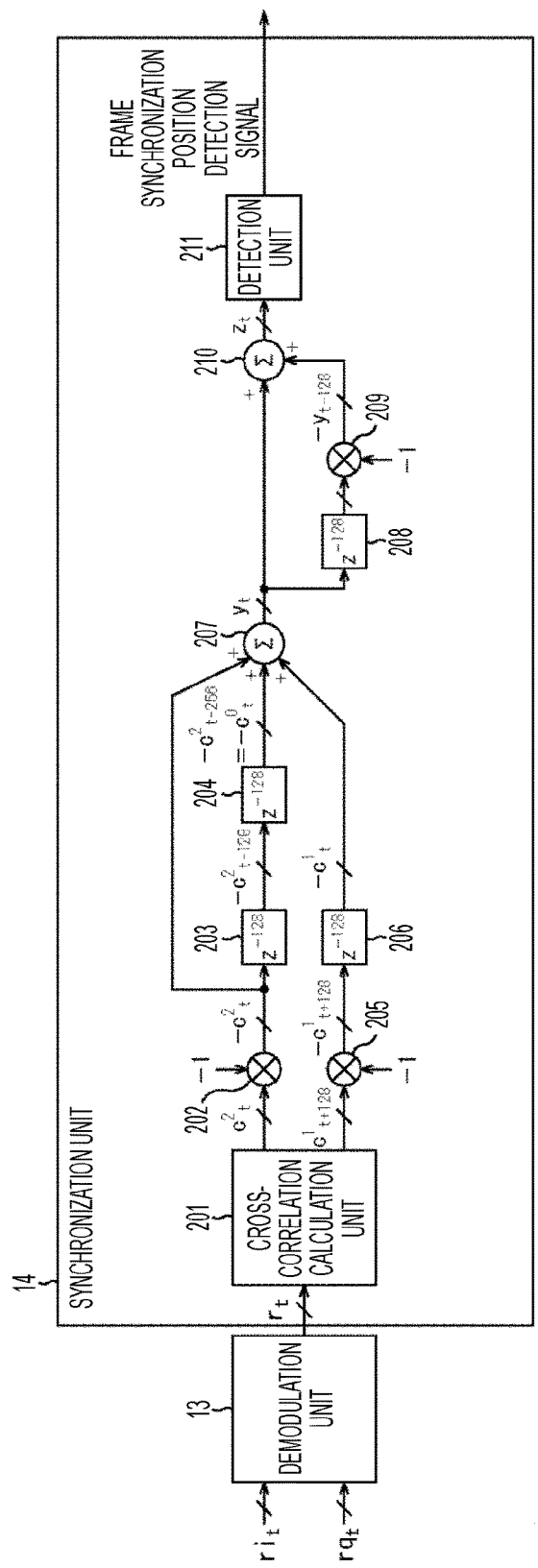
FIG. 17 is a block diagram illustrating an exemplary configuration of a synchronization unit that performs the frame synchronization processing in FIG. 16.

FIG. 17 is a block diagram illustrating an exemplary configuration of the synchronization unit 14 that performs the frame synchronization processing in FIG. 12 using the SC PHY preamble of IEEE 802.11ad.

The synchronization unit 14 includes a cross-correlation calculation unit 201, a multiplication unit 202, a delay unit 203, a delay unit 204, a multiplication unit 205, a delay unit 206, an addition unit 207, a delay unit 208, a multiplication unit 209, an addition unit 210, and a detection unit 211. The synchronization unit 14 is input with a received signal $r_t$ obtained by demodulating, by the demodulation unit 13, received complex signals $ri_t$ and $rq_t$ at time t.

The cross-correlation calculation unit 201 calculates and outputs cross-correlation $c^2_t$ and $c^1_{t+128}$ between the received signal sequence r formed by a received signal $r_t$ and each of the known signal sequences Ga and Gb at time t. The received signal sequence r is represented by the following formula (32).

[Mathematical Formula 32]

$$r=[r_{t-127}\ r_{t-126}\ \ldots\ r_{t-1}\ r_t] \quad (32)$$

A signal representing the cross-correlation $c^2_t$ output from the cross-correlation calculation unit 201 is supplied to the multiplication unit 202 and a signal representing the cross-correlation $c^1_{t+128}$ is supplied to the multiplication unit 205.

The multiplication unit 202 multiplies the cross-correlation $c^2_t$ by −1, which is elements $p^0$ and $p^2$ of the spreading code sequence P and outputs a signal representing the cross-correlation $-c^2_t$ that is the multiplication result to the delay unit 203 and the addition unit 207.

The delay unit 203 delays the cross-correlation $-c^2_t$ by 128 (L) time and outputs a signal representing $-c^2_{t-128}$ to the delay unit 204.

The delay unit 204 further delays the cross-correlation $-c^2_{t-128}$ by 128 time and outputs a signal representing $-c^2_{t-256}$ ($=-c^0_t$) to the addition unit 207.

The multiplication unit 205 multiplies the cross-correlation $c^1_{t+128}$ by −1, which an element $p^1$ of the spreading code sequence P and outputs a signal representing the cross-correlation $-c^1_{t+128}$ that is the multiplication result to the delay unit 206.

The delay unit 206 delays the cross-correlation $-c^1_{t+128}$ by 128 time and outputs a signal representing $-c^1_t$ to the addition unit 207.

The addition unit 207 adds cross-correlation $-c^0_t$, $-c^1_t$, and $-c^2_t$ and outputs the cross-correlation $y_t$. The cross-correlation $y_t$ is derived on the basis of cross-correlation $C=[c^0_t\ c^1_t\ c^2_t]$ at time t and spreading code sequence (polarity pattern) $P=[p^0\ p^1\ p^2]=[-1\ -1\ -1]$ (formula (9)). The cross-correlation $y_t$ is supplied to the delay unit 208 and the addition unit 210.

The delay unit 208 delays the cross-correlation $y_t$ by 128 time and outputs a signal representing $y_{t-128}$ to the multiplication unit 209.

The multiplication unit 209 multiplies the cross-correlation $y_{t-128}$ by −1, which an element $q^1$ of the known correlation sequence Q and outputs a signal representing the cross-correlation $-y_{t-128}$ that is the multiplication result to the addition unit 210.

The addition unit 207 adds cross-correlation $-y_{t-128}$ and $y_t$ and outputs the likelihood information $z_t$. The likelihood information $z_t$ is derived on the basis of cross-correlation $Y=[y_t\ y_{t-128}\ y_{t-256}]$ at time t and the known correlation sequence (correlation pattern) $Q=[q^0\ q^1\ q^2]=[+1\ -1\ 0]$ (formula (11)). The likelihood information $z_t$ is represented by the following formula (33).

[Mathematical Formula 33]

$$Z_t = q^0 y_t + q^1 y_{t-128} + q^2 y_{t-256} = (+1) \times y_t + (+1) \times y_{t-128} + (0) \times y_t \quad (33)$$

The likelihood information $z_t$ is supplied to the detection unit 211.

The detection unit 211 detects the likelihood information $z_t$ more than or equal to a threshold value by comparing to the predetermined threshold value or detects the maximum likelihood information $z_t$.

The detection unit 211 specifies time when the likelihood information $z_t$ more than or equal to the threshold value or the maximum likelihood information $z_t$ is detected as reception time of the last bit of the synchronization sequence and outputs a frame synchronization position detection signal representing the specified time. The frame synchronization position detection signal output from the detection unit 211 is supplied to the equalization unit 15 and used for equalization processing.

Meanwhile, in the frame synchronization processing in FIG. 12, the greater a difference (dynamic range of likelihood information) between likelihood information at a position of the last bit of the synchronization sequence and likelihood information at other positions, the more performance is enhanced.

A preamble including a synchronization sequence that allows for obtaining a wide dynamic range when the frame synchronization processing in FIG. 12 is applied will be described.

<Exemplary Application to New Preamble>

About Preamble Structure

Figure 18:
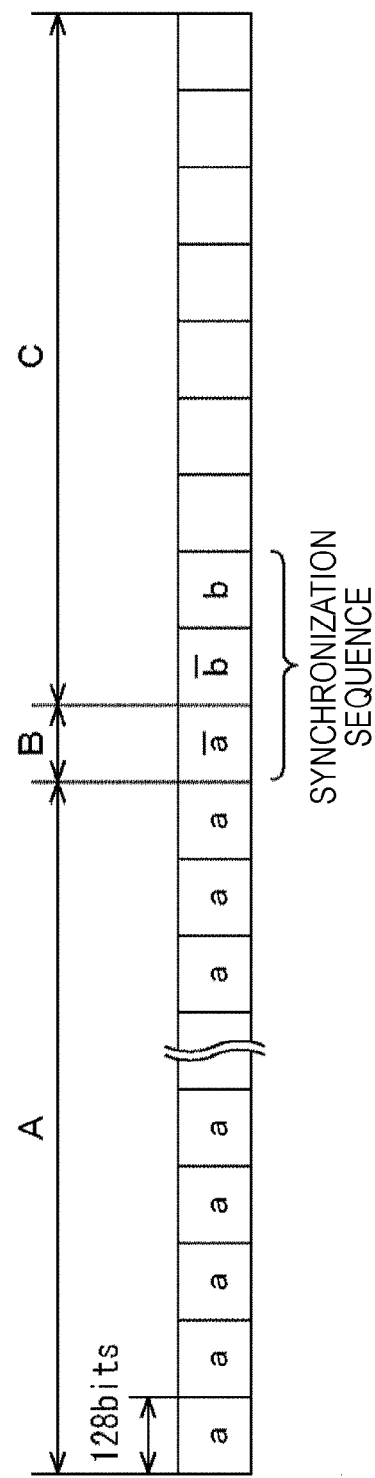
FIG. 18 is a diagram illustrating a structure of a new preamble.

FIG. 18 is a diagram illustrating an exemplary configuration of a new preamble that can enlarge a dynamic range of likelihood information.

The new preamble includes known signal sequences {a, b} of Golay complementary sequences of a length of L symbols (L bits) and inverse sequences {−a, −b} that are bit inverse sequences of the known signal sequences {a, b}, respectively. A bit inverse sequence is denoted with a sign "−" above or in front of a symbol representing a signal sequence as appropriate.

The frame detection signal sequence A is repetitions of the known signal sequence a, which is one type of signal sequence, for a predetermined number of times.

The frame synchronization signal sequence B includes the inverse sequence −a, which is one type of signal sequence among four types of known signal sequences [a, b, −a, −b].

The channel estimation signal sequence C includes the inverse sequence −b in the head thereof, followed by a second signal sequence, which is the known signal sequence b. Thereafter, the known signal sequences a, b, −a, and −b follow in the order mentioned.

Here, the known signal sequences a and b may be switched. Moreover, the frame synchronization signal sequence B may be included in the frame detection signal sequence A or included in the channel estimation signal sequence C.

The receiver 2 performs frame synchronization using, as a synchronization sequence, a signal sequence that has a length of 3L and includes the inverse sequence −a of the frame synchronization signal sequence B, the head inverse sequence −b of the channel estimation signal sequence C, and a subsequent known signal sequence b.

Figure 19:
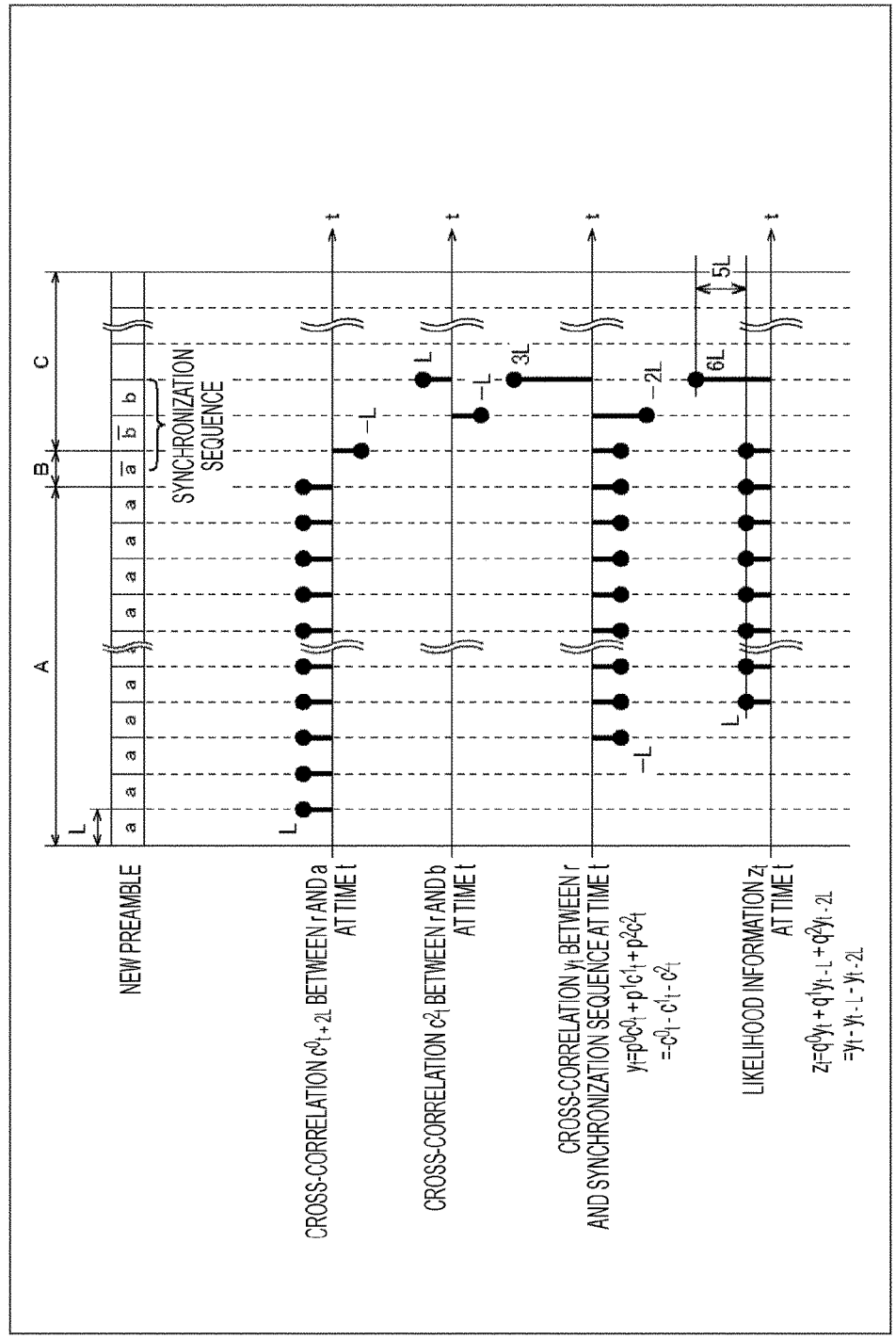
FIG. 19 is a diagram schematically illustrating frame synchronization processing using a new preamble.

FIG. 19 is a diagram schematically illustrating the frame synchronization processing in FIG. 12 using a new preamble.

In FIG. 19, the number of known signal sequences N, the known signal sequence D, the spreading code sequence P, the frame synchronization signal sequence B', and the known correlation sequence Q are expressed as in the following.

$N=3$ $D=[d^0\ d^1\ d^2]=[a\ b\ b]$ $P=[p^0\ p^1\ p^2]=[-1\ -1\ +1]$ $B'=[p^0 d^0\ p^1 d^1\ p^2 d^2]=[-a\ -b\ b]$ $Q=[q^0\ q^1\ q^2]=[+1\ -1\ -1]$

A first time axis from the top in FIG. 19 illustrates a peak of cross-correlation between the received signal sequence r and the known signal sequence a at time t. As illustrated in FIG. 19, every time the known signal sequence a is received as the received signal sequence r, a peak of a peak value L occurs. Furthermore, every time the inverse sequence −a is received as the received signal sequence r, a peak of a peak value −L occurs.

Specifically, a peak of peak value L occurs every other L time during a period from L time after a reference, which is the head of the frame detection signal sequence A, to time of the last bit of the frame detection signal sequence A. A peak of peak value −L further occurs at time of the last bit of the frame synchronization signal sequence B.

A second time axis from the top in FIG. 19 illustrates a peak of cross-correlation between the received signal sequence r and the known signal sequence b at time t. As illustrated in FIG. 19, every time the known signal sequence b is received as the received signal sequence r, a peak of peak value L occurs. Furthermore, every time the inverse sequence −b is received as the received signal sequence r, a peak of peak value −L occurs.

A peak of peak value −L occurs L time after time of the last bit of the frame synchronization signal sequence B. A peak of peak value L further occurs L time thereafter.

A third time axis from the top in FIG. 19 illustrates a peak of cross-correlation between the received signal sequence r and a synchronization sequence [−a −b b] at time t. As illustrated in FIG. 19, a peak of peak value −L occurs time 3L after a reference, which is the head of the frame detection signal sequence A. Thereafter, a peak of peak value −L occurs every other L time until time of the last bit of the frame synchronization signal sequence B. A peak of peak value −2L further occurs L time after time of the last bit of the frame synchronization signal sequence B and a peak of peak value 3L occurs L time thereafter.

A fourth time axis from the top in FIG. 19 illustrates a peak of likelihood information at time t. The likelihood information is a result of convolution arithmetic operation of the cross-correlation illustrated on the third time axis from the top and the known correlation sequence Q. As illustrated in FIG. 19, a peak of peak value L occurs time 4L after a reference, which is the head of the frame detection signal sequence A. Thereafter, a peak of peak value L occurs every other L time until time of the last bit of the frame synchronization signal sequence B. A peak of peak value 6L further occurs time 2L after time of the last bit of the frame synchronization signal sequence B.

The receiver 2 compares the peak value of likelihood information derived in the above manner to a threshold value and performs frame synchronization by detecting a peak value more than or equal to the threshold value or by detecting the maximum peak value.

In this manner, using a synchronization sequence [−a −b b] having a length of 3L can enlarge a difference between likelihood information at a position of the last bit of the synchronization sequence and likelihood information at other positions.

When frame synchronization is performed by the above method using the synchronization sequence [−a −b b], the dynamic range of likelihood information is 5L as illustrated in FIG. 19. Using the synchronization sequence [−a −b b] allows for enhancing performance of frame synchronization.

Specific examples of the known signal sequences a and b will be described later.

About Configuration of Synchronization Unit

Figure 20:
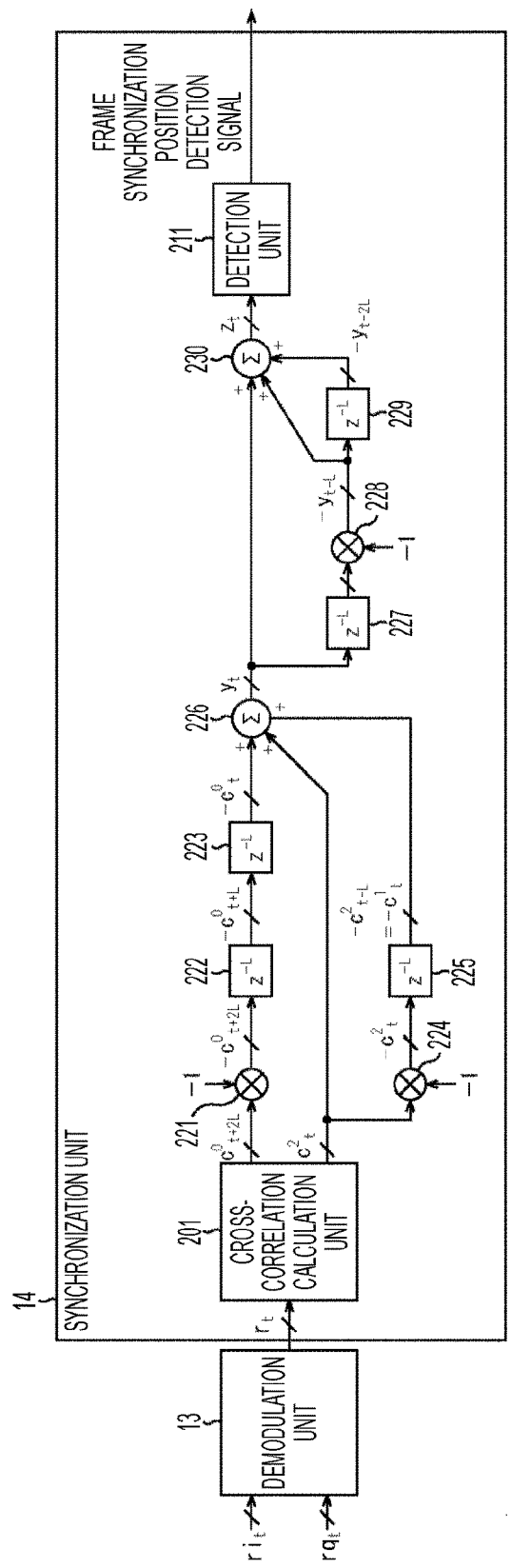
FIG. 20 is a block diagram illustrating an exemplary configuration of a synchronization unit that performs the frame synchronization processing in FIG. 19.

FIG. 20 is a block diagram illustrating an exemplary configuration of the synchronization unit 14 that performs the frame synchronization processing in FIG. 12 using the new preamble. A configuration same as the configuration having been described with reference to FIG. 17 is denoted as the same symbol. Overlapping descriptions are omitted as appropriate.

The synchronization unit 14 includes a cross-correlation calculation unit 201, a multiplication unit 221, a delay unit 222, a delay unit 223, a multiplication unit 224, a delay unit 225, an addition unit 226, a delay unit 227, a multiplication unit 228, a delay unit 229, an addition unit 230, and a detection unit 211.

The cross-correlation calculation unit 201 calculates and outputs cross-correlation $c^0_{t+2L}$, $c^2_t$ between the received signal sequence r and each of the known signal sequences a and b at time t. A signal representing the cross-correlation $c^0_{t+2L}$ is supplied to the multiplication unit 221 and a signal representing the cross-correlation $c^2_t$ is supplied to the multiplication unit 224 and the addition unit 226.

The multiplication unit 221 multiplies the cross-correlation $c^0_{t+2L}$ by −1, which an element $p^0$ of the spreading code sequence P and outputs a signal representing the cross-correlation $-c^0_{t+2L}$ that is the multiplication result to the delay unit 222.

The delay unit 222 delays the cross-correlation $-c^0_{t+2L}$ by L time and outputs a signal representing $-c^0_{t+L}$ to the delay unit 223.

The delay unit 223 further delays the cross-correlation $-c^0_t$ by L time and outputs a signal representing $-c^0_t$ to the addition unit 226.

The multiplication unit 224 multiplies the cross-correlation $c^2_t$ by −1, which an element $p^1$ of the spreading code sequence P and outputs a signal representing the cross-correlation $-c^2_t$ that is the multiplication result to the delay unit 225.

The delay unit 225 delays the cross-correlation $-c^2_t$ by L time and outputs a signal representing $-c^2_{t-L}$ ($=-c^1_t$) to the addition unit 226.

The addition unit 226 adds cross-correlation $-c^0_t$, $-c^1_t$, and $c^2_t$ and outputs the cross-correlation $y_t$. The cross-correlation $y_t$ is derived on the basis of cross-correlation $C=[c^0_t\ c^1_t\ c^2_t]$ at time t and spreading code sequence (polarity pattern) $P=[p^0\ p^1\ p^2]=[-1\ -1\ +1]$. The cross-correlation $y_t$ is supplied to the delay unit 227 and the addition unit 230.

The delay unit 227 delays the cross-correlation $y_t$ by L time and outputs a signal representing $y_{t-L}$ to the multiplication unit 228.

The multiplication unit 228 multiplies the cross-correlation $y_{t-L}$ by $-1$, which an element $q^1$ of the known correlation sequence Q and outputs a signal representing the cross-correlation $-y_{t-L}$ that is the multiplication result to the delay unit 229 and the addition unit 230.

The delay unit 229 further delays the cross-correlation $-y_{t-L}$ by L time and outputs a signal representing $-y_{t-2L}$ to the addition unit 230.

The addition unit 230 adds cross-correlation $-y_{t-2L}$, $-y_{t-L}$, $y_t$ and outputs the likelihood information $z_t$. The likelihood information $z_t$ is derived on the basis of cross-correlation $Y=[y_t\ y_{t-L}\ y_{t-2L}]$ at time t and the known correlation sequence (correlation pattern) $Q=[q^0\ q^1\ q^2]=[+1\ -1\ -1]$. The likelihood information $z_t$ is represented by the following formula (34).

[Mathematical Formula 34]

$$Zt=q^0 y_t+q^1 y_{t-L}+q^2 y_{t-2L}=(+1)\times y_t+(-1)\times y_{t-L}+(-1)\times y_{t-L}+(-1)\times y_{t-2L} \quad (34)$$

The likelihood information $z_t$ is supplied to the detection unit 211.

The detection unit 211 detects the likelihood information $z_t$ more than or equal to a threshold value by comparing to the predetermined threshold value or detects the maximum likelihood information $z_t$.

The detection unit 211 specifies time when the likelihood information $z_t$ more than or equal to the threshold value or the maximum likelihood information $z_t$ is detected as reception time of the last bit of the synchronization sequence and outputs a frame synchronization position detection signal. The frame synchronization position detection signal output from the detection unit 211 is supplied to the equalization unit 15 and used for equalization processing.

The above processing allows for obtaining 5L as the dynamic range of likelihood information. In the frame synchronization method in FIG. 12, using the new preamble can enlarge the dynamic range of likelihood information by 3L as compared to the case of using the SC PHY preamble of IEEE 802.11ad, thereby allowing for enhancing performance of frame synchronization.

A synchronization sequence different from the synchronization sequence [−a −b b] can be included in the new preamble.

About Synchronization Sequence

FIG. 21 is a diagram illustrating exemplary synchronization sequences.

The synchronization sequences illustrated in FIG. 21 have a length of P·L and allow for obtaining a dynamic range of likelihood information of 3L or more. In FIG. 21, the maximum dynamic range and a synchronization sequence that can achieve the dynamic range are illustrated where P is within 2 to 7.

In the example of FIG. 21, with any of the synchronization sequences, the frame detection signal sequence A arranged before the synchronization sequence is a repetition of the known signal sequence a.

As illustrated in FIG. 21, the maximum dynamic range of likelihood information is 3L where P=2. Synchronization sequences capable of implementing a dynamic range of 3L include [−a b] formed by the inverse sequence −a of the frame synchronization signal sequence B and leading one known signal sequence b of the channel estimation signal sequence C.

Performing the frame synchronization processing in FIG. 12 using a preamble including the synchronization sequence [−a b] allows for obtaining the dynamic range of likelihood information of 3L.

Where P=3, the maximum dynamic range of likelihood information is 5L. Synchronization sequences capable of implementing a dynamic range of 5L include, other than the aforementioned [−a −b b], [−a b −b] formed by one signal sequence of the frame synchronization signal sequence B and leading two signal sequences of the channel estimation signal sequence C.

Performing the frame synchronization processing in FIG. 12 using a preamble including the synchronization sequence [−a b −b] allows for obtaining the dynamic range of likelihood information of 5L.

Where P=4, the maximum dynamic range of likelihood information is 7L. Synchronization sequences capable of implementing a dynamic range of 7L include eight types of signal sequences formed by, when the frame synchronization signal sequence B includes the inverse sequence −a, the inverse sequence −a and leading three signal sequences of the channel estimation signal sequence C. The eight types of synchronization sequences include [−a b a −a], [−a −b a −a], [−a −b b a], [−a b −b a], [−a a a b], [−a a −a b], [−a a a −b], and [−a a −a −b].

Alternatively, when the frame synchronization signal sequence B includes the known signal sequence b, included are two types of signal sequences formed by the known signal sequence b and the leading three signal sequences of the channel estimation signal sequence C. The two synchronization sequences include [b −b a b] and [b −a −b −b].

Alternatively, when the frame synchronization signal sequence B includes the inverse sequence −b, included are two types of signal sequences formed by the inverse sequence −b and the leading three signal sequences of the channel estimation signal sequence C. The two synchronization sequences include [−b b a −b] and [−b −a b b].

Likewise, where P=5, the maximum dynamic range of likelihood information is 10L. Synchronization sequences capable of implementing a dynamic range of 10L include two types of signal sequences formed by one signal sequence of the frame synchronization signal sequence B and leading four signal sequences of the channel estimation signal sequence C.

Where P=6, the maximum dynamic range of likelihood information is 13L. Synchronization sequences capable of implementing a dynamic range of 13L include four types of signal sequences formed by one signal sequence of the frame synchronization signal sequence B and leading five signal sequences of the channel estimation signal sequence C.

Where P=7, the maximum dynamic range of likelihood information is 16L. Synchronization sequences capable of implementing a dynamic range of 16L include seven types of signal sequences formed by one signal sequence of the frame synchronization signal sequence B and leading six signal sequences of the channel estimation signal sequence C.

Performing the frame synchronization processing in FIG. 12 using a preamble including a signal sequence other than [−a −b b] as the synchronization sequence allows for obtaining wide dynamic range of likelihood information.

Note that a synchronization sequence capable of implementing the maximum dynamic range of likelihood information may be included in the preamble by setting P at 8 or more. Selection of the known signal sequences a and b that form the respective synchronization sequences in FIG. 21 will be described below.

About Golay Complementary Sequence

First, a Golay complementary sequence will be described. The known signal sequences a and b are Golay complementary sequences.

The following formula (35) holds where the length of Golay complementary sequences a and b are denoted as $2^N$, ith elements of the Golay complementary sequences a and b are denoted as a(i) and b(i) ($0 \leq i < L = 2^N$), respectively, Ra(j) represents a autocorrelation function of the sequence a, and Rb(j) represents a autocorrelation function of the sequence b.

[Mathematical Formula 35]

$$Ra(j) + Rb(j) = \begin{cases} 2L & \text{for } j = 0 \\ 0 & \text{for } j \neq 0 \end{cases} \quad (35)$$

Values Ra(j) and Rb(j) in formula (35) are expressed by the following formulas (36) and (37), respectively.

[Mathematical Formula 36]

$$Ra(j) = \sum_{i=0}^{L-j-1} a(i)a(i+j) \quad (36)$$

[Mathematical Formula 37]

$$Rb(j) = \sum_{i=0}^{L-j-1} b(i)b(i+j) \quad (37)$$

Furthermore, values a(i) and b(i) are represented by the following formulas (38) to (41).

[Mathematical Formula 38]

$$a_0(i) = \delta(i) \quad (38)$$

[Mathematical Formula 39]

$$b_0(i) = \delta(i) \quad (39)$$

[Mathematical Formula 40]

$$a_n(i) = a_{n-1}(i) + W_n b_{n-1}(i - D_n) \quad (40)$$

[Mathematical Formula 41]

$$b_n(i) = a_{n-1}(i) + W_n b_{n-1}(i - D_n) \quad (41)$$

Here, n represents an integer that satisfies $1 \leq n \leq N$. With a(i) and b(i), $a(i) = a_N(i)$ and $b(i) = b_N(i)$ hold, respectively. Letter $\delta(i)$ represents the Kronecker delta function.

Letter D represents a delay vector. The delay vector D is represented by the following formula (42).

[Mathematical Formula 42]

$$D = [D_0, D_1, \ldots, D_{N-1}] \quad (42)$$

Letter W represents a weight vector. The weight vector W is represented by the following formula (43).

[Mathematical Formula 43]

$$W = [W_0, W_1, \ldots, W_{N-1}] \quad (43)$$

When the Golay complementary sequences a and b are Binary Golay complementary sequences, the delay vector D includes elements $\{1, 2, 4, \ldots, 2^{N-1}\}$ in any order. Meanwhile, the weight vector W is +1 or −1.

A cross correlator used for calculation of cross-correlation between the Golay complementary sequence and a received signal sequence can be effectively configured as compared to a cross correlator of a general FIR type. This cross correlator is called an efficient Golay correlator (EGC).

Figure 22:
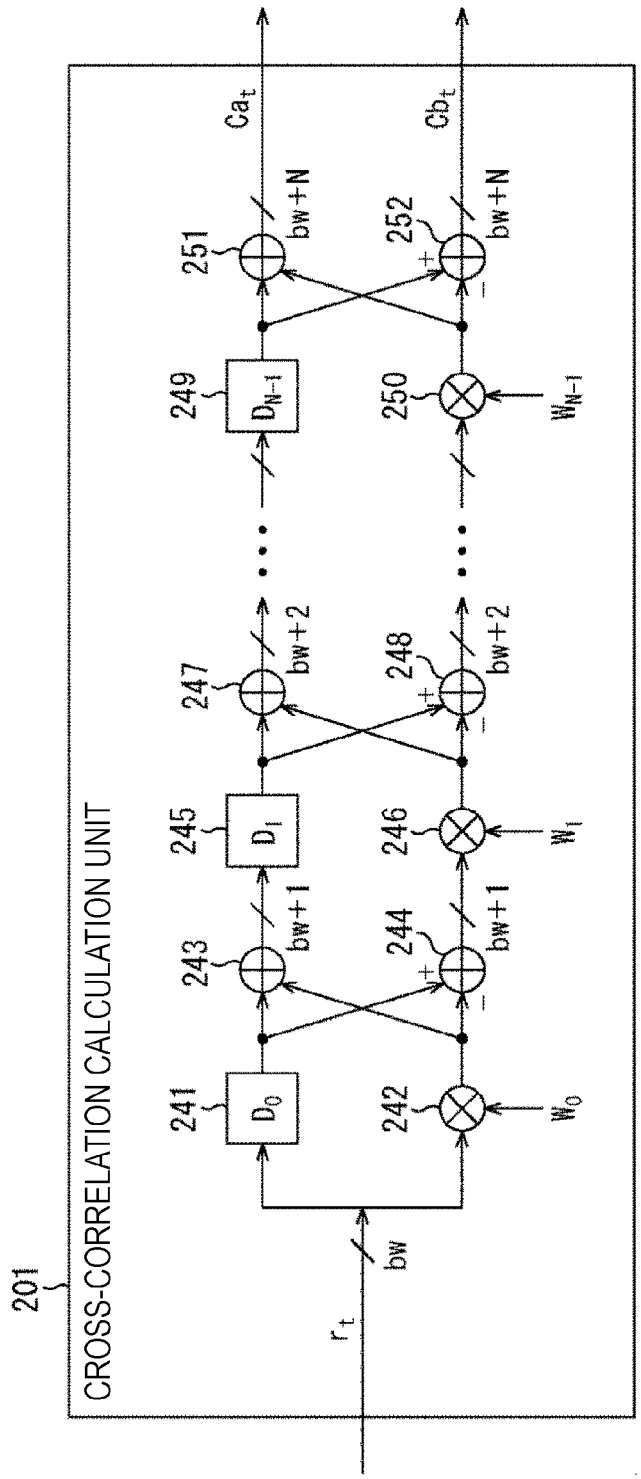
FIG. 22 is a circuit diagram illustrating an exemplary configuration of a cross-correlation calculation unit.

FIG. 22 is a circuit diagram illustrating an exemplary configuration when a cross-correlation calculation unit 201 includes an EGC. For example, the cross-correlation calculation unit 201 in FIG. 20 has the configuration illustrated in FIG. 22.

As illustrated in FIG. 22, the cross-correlation calculation unit 201 includes a plurality of stages, each of the stages including one delay element, one multiplier, one adder, and one subtracter. A received signal $r_t$ with a bit width bw is input to a delay element 241 and a multiplier 242.

A first stage includes the delay element 241, the multiplier 242, an adder 243, and a subtracter 244.

The delay element 241 delays the received signal $r_t$ by an element $D_0$ of the delay vector D and outputs the received signal $r_t$. The multiplier 242 multiplies the received signal $r_t$ by an element $W_0$ of the weight vector W and outputs the multiplication result. The adder 243 adds the output from the delay element 241 and the output from the multiplier 242 and outputs the addition result. The subtracter 244 subtracts the output from the multiplier 242 from the output from the delay element 241 and outputs the subtraction result. An output from the first stage is a signal with a bit width of bw+1.

A second stage includes a delay element 245, a multiplier 246, an adder 247, and a subtracter 248.

The delay element 245 delays the output from the adder 243 by an element $D_1$ of the delay vector D. The multiplier 246 multiplies the output from the subtracter 244 by an element $W_1$ of the weight vector W and outputs the multiplication result. The adder 247 adds the output from the delay element 245 and the output from the multiplier 246 and outputs the addition result. The subtracter 248 subtracts the output from the multiplier 246 from the output from the delay element 245 and outputs the subtraction result. An output from the second stage is a signal with a bit width of bw+2.

An Nth stage that is the last stage includes a delay element 249, a multiplier 250, an adder 251, and a subtracter 252.

The delay element 249 delays an output from an adder of a preceding stage by an element $D_{N-1}$ of the delay vector D and thereby outputs. The multiplier 250 multiplies an output from a subtracter of the preceding stage by an element $W_{N-1}$ of the weight vector W and outputs the multiplication result. The adder 251 adds the output from the delay element 249 and the output from the multiplier 250 and outputs the addition result as cross-correlation between the received signal sequence r and the Golay complementary sequence a. The subtracter 252 subtracts the output from the delay element 249 and the output from the multiplier 250 and outputs the subtraction result as cross-correlation between the received signal sequence r and the Golay complementary sequence b.

In this manner, a configuration of the cross-correlation calculation unit 201 is determined by the delay vector D and the weight vector W.

Such Golay complementary sequences and EGC are disclosed in Non-Patent Documents 2 to 4.

Non-Patent Document 2 M. J. E. Golay, "Complementary series," IRE Transactions on Information Theory, vol. 7, Issue 2, pp. 82-87, April 1961.

Non-Patent Document 3 S. Z. Budisin, "Efficient pulse compressor for Golay complementary sequences," IEEE electronics letters, vol. 27, No. 3, pp. 219-220, 1991.

Non-Patent Document 4 B. M. Popovic, "Efficient Golay correlator," IEEE electronics letters, vol. 35, No. 17, pp. 1427-1428, 1999.

About Selection of Known Signal Sequence

Figure 23:
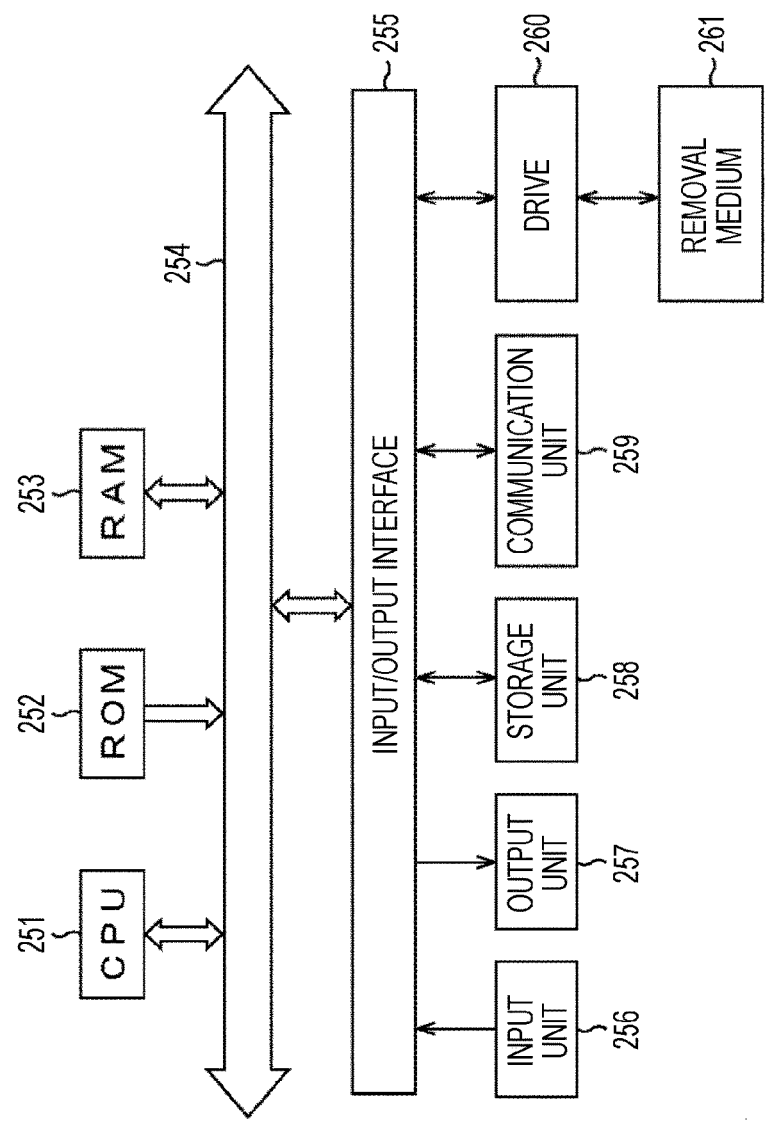
FIG. 23 is a block diagram illustrating an exemplary configuration of a computer.

FIG. 23 is a block diagram illustrating an exemplary hardware configuration of a computer that selects known signal sequences and b. Selection of the known signal sequences a and b is performed in advance before transmission of data.

A central processing unit (CPU) 251, a read only memory (ROM) 252, and a random access memory (RAM) 253 are connected to each other by bus 254.

The bus 254 is further connected with an input/output interface 255. The input/output interface 255 is connected with an input unit 256 formed by a keyboard, a mouse, or the like and an output unit 257 formed by a display, a speaker, or the like. Furthermore, the input/output interface 255 is connected with a storage unit 258 formed by a hard disk drive, a nonvolatile memory, or the like, a communication unit 259 formed by a network interface or the like, and a drive 260 that drives a removal medium 261.

Figure 24:
FIG. 24 is a block diagram illustrating an exemplary functional configuration of the computer in FIG. 23.

FIG. 24 is a block diagram illustrating an exemplary functional configuration of the computer in FIG. 23. At least a part of functional units illustrated in FIG. 24 is implemented by execution of a predetermined program by the CPU 251 in FIG. 23.

In the computer in FIG. 23, a signal sequence generation unit 271 and a signal sequence selection unit 272 are implemented.

The signal sequence generation unit 271 generates Golay complementary sequences a and b that are candidates for known signal sequences a and b. The Golay complementary sequences a and b generated by the signal sequence generation unit 271 are supplied to the signal sequence selection unit 272.

The signal sequence selection unit 272 generates, on the basis of the Golay complementary sequences a and b, information that serves as a reference for selecting a predetermined sequence. For example, the signal sequence selection unit 272 performs operations of code-word digital sum (CDS) and running digital sum (RDS).

Further, the signal sequence selection unit 272 selects, on the basis of the CDS and the RDS, a predetermined sequence from among the Golay complementary sequences a and b generated by the signal sequence generation unit 271. The Golay complementary sequences a and b selected by the signal sequence selection unit 272 are used for generation of a preamble.

Figure 25:
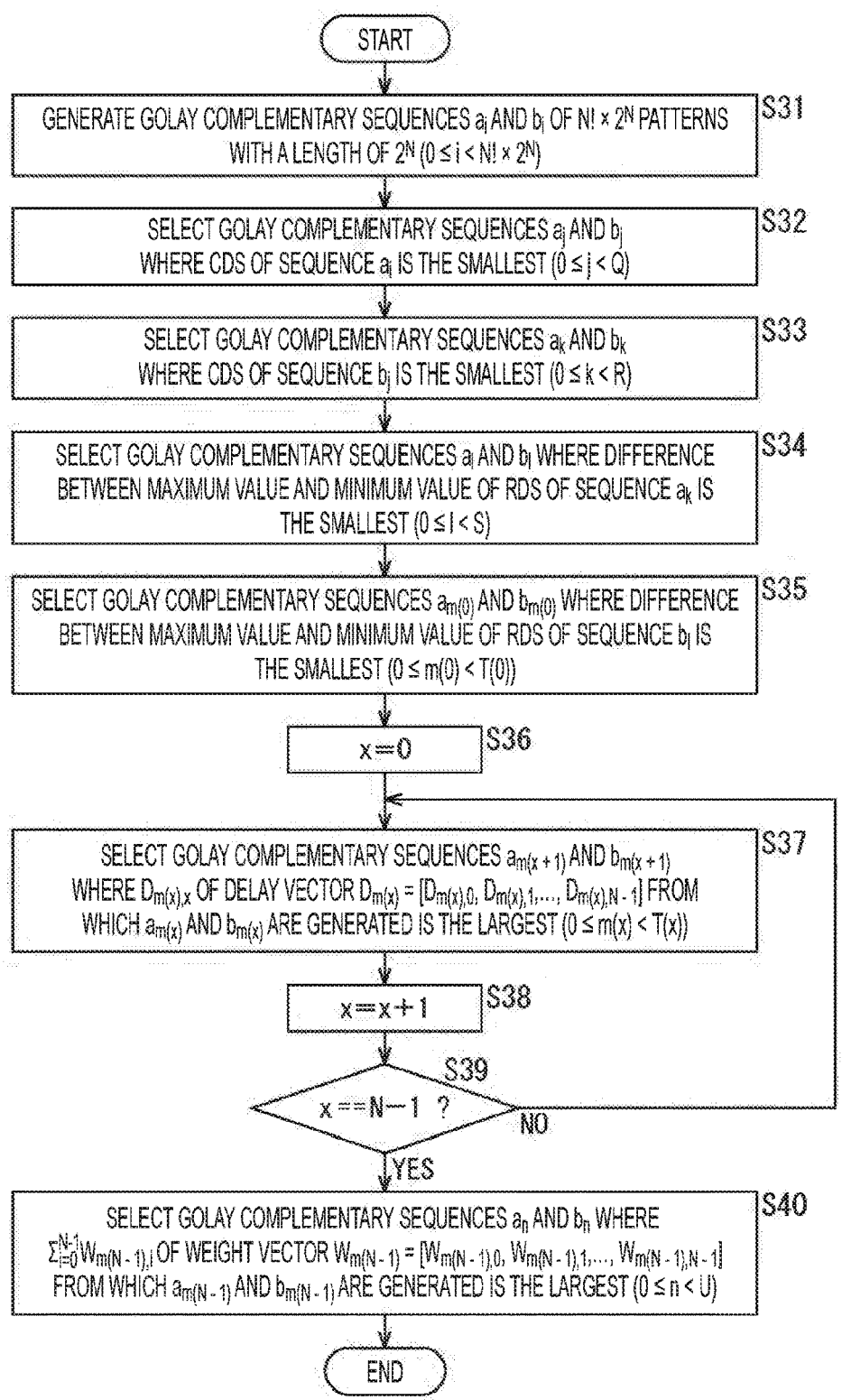
FIG. 25 is a flowchart explaining a determination procedure of known signal sequences a and b.

Here, a determination procedure of known signal sequences a and b will be described with reference to a flowchart in FIG. 25.

In step S31, the signal sequence generation unit 271 generates all Golay complementary sequences (Binary Golay complementary sequences) $a_i$ and $b_i$ of $N! \times 2^N$ patterns of a length $L=2^N$. In FIG. 25, subscripts of the sequences a and b represent the number of the generated Golay complementary sequence. Value i is an integer greater than or equal to zero and less than $N! \times 2^N$.

In step S32, the signal sequence selection unit 272 selects sequences $a_j$ and $b_j$ where a CDS of the sequence $a_i$ is the smallest from among the sequences $a_i$ and $b_i$ generated in step S31.

In step S33, the signal sequence selection unit 272 selects sequences $a_k$ and $b_k$ where a CDS of the sequence $b_j$ is the smallest from among the sequences $a_j$ and $b_j$ selected in step S32.

In step S34, the signal sequence selection unit 272 selects sequences $a_l$ and $b_l$ where a difference between the maximum value and the minimum value of RDS of the sequence $a_k$ is the smallest from among the sequences $a_k$ and $b_k$ selected in step S33.

In step S35, the signal sequence selection unit 272 selects sequences $a_{m(0)}$ and $b_{m(0)}$ where a difference between the maximum value and the minimum value of RDS of the sequence $b_l$ is the smallest from among the sequences $a_l$ and $b_l$ selected in step S34.

With the smallest CDS and the smallest difference between the maximum value and the minimum value of the RDS, a low-frequency-component of the signal sequence is estimated as being the smallest. When a low-frequency-component is cut in a transceiver or when a received signal includes low-frequency-noise, if a known signal sequence included in a preamble has a low-frequency-component, frame synchronization performance is deteriorated.

In this manner, selecting a sequence where the CDS is the smallest and a difference between the maximum value and the minimum value of the RDS is the smallest and performing frame synchronization using a preamble including a synchronization sequence formed by such a sequence allow for enhancing frame synchronization performance.

Next, in steps S36 to S39 the sequences a and b are selected with the delay vector D as a reference.

When the sequences a and b are Binary Golay complementary sequences, as described above, the delay vector D includes elements $\{1, 2, 4, \ldots, 2^{N-1}\}$ in any order. An element of the delay vector D defines a delay amount (register size) of a delay element of each of the stages of the EGC. In a later stage the bit width of a signal increases and thus it is preferable from the perspective of a circuit scale that a delay amount of an earlier delay element is larger and a delay amount of a later delay element is smaller.

Processing of steps S36 to S39 is to select sequences a and b that allows for configuring an EGC where a delay amount of an earlier delay element is larger and a delay amount of a later delay element is smaller.

In step S36, the signal sequence selection unit 272 sets a default value 0 to a variable x.

In step S37, the signal sequence selection unit 272 selects sequences $a_{m(1)}$ and $b_{m(1)}$ where a first element $D_{m(0), 0}$ of a delay vector $D_{m(0)}$, from which the sequences are generated, is the largest from among the sequences $a_{m(0)}$ and $b_{m(0)}$ selected in step S35.

In step S38, the signal sequence selection unit 272 increments a value of the variable x by 1.

In step S39, the signal sequence selection unit 272 determines whether a value of the variable x is N−1. If the value of the variable x is determined as not being N−1 in step S39, the signal sequence selection unit 272 repeats processing of step S37 and steps thereafter.

That is, the signal sequence selection unit 272 selects sequences $a_{m(2)}$ and $b_{m(2)}$ where a second element $D_{m(1), 1}$ of a delay vector, from which the sequences are generated, is the largest from among sequences $a_{m(1)}$ and $b_{m(1)}$. Moreover, the signal sequence selection unit 272 selects sequences $a_{m(3)}$ and $b_{m(3)}$ where an element $D_{m(2), 2}$ is the largest from among sequences $a_{m(2)}$ and $b_{m(2)}$. The signal sequence selection unit 272 sequentially repeats such processing until sequences $a_{m(N-1)}$ and $b_{m(N-1)}$, where an element $D_{m(N-2), N-2}$ is the largest, are selected.

If the value of the variable x is determined as being N−1 in step S39, processing proceeds to step S40.

Next, in steps S40 the sequences a and b are selected with the weight vector W as a reference.

When the sequences a and b are Binary Golay complementary sequences, an element of the weight vector W is +1 or −1. From the perspective of a circuit scale it is preferable that multiplication by +1 is performed more in each of the stages in the EGC. Performing multiplication by +1 means processing of outputting an input signal as it is.

Processing in step S40 is to select a combination of sequences a and b that allows for configuring an EGC where multiplication by +1 is performed more.

That is, in step S40, the signal sequence selection unit 272 selects sequences $a_n$ and $b_n$ that allow a cross correlator, where the total value of respective elements of the weight vector W is the largest among the sequences $a_{m(N-1)}$ and $b_{m(N-1)}$ selected by the processing in steps S36 to S39, to derive cross-correlation. The total value of respective elements of the weight vector W is represented by the following formula (44).

[Mathematical Formula 44]

$$\Sigma_{i=0}^{N-1} W_i \quad (44)$$

In this manner, selecting the sequences a and b (sequences $a_n$ and $b_n$) with the delay vector D and the weight vector W as references allows a circuit scale of an EGC to be small.

FIG. 26 is a diagram illustrating a result of comparison between CDSs and RDSs of a Golay complementary sequence used in a new preamble where L=128 and CDSs and RDSs of a Golay complementary sequence used in the IEEE 802.11ad SC PHY preamble. The Golay complementary sequence used in the new preamble is the sequence determined by the processing in FIG. 25.

As illustrated in FIG. 26, the minimum value of the CDS of the sequence a used in the new preamble is zero and the minimum value of the CDS of the sequence b is −16. Meanwhile, the minimum value of the CDS of the sequence a (Ga) used in the IEEE 802.11ad SC PHY preamble is zero and the minimum value of the CDS of the sequence b (Gb) is 16.

A difference between the maximum value and the minimum value of the RDS of the sequence a used in the new preamble is 9 and a difference between the maximum value and the minimum value of the RDS of the sequence b is 22. Meanwhile, a difference between the maximum value and the minimum value of the RDS of the sequence a (Ga) used in the IEEE 802.11ad SC PHY preamble is 15 and a difference between the maximum value and the minimum value of the RDS of the sequence b (Gb) is 22. According to the sequences a and b used in the new preamble, the difference between the maximum value and the minimum value of the RDS of the sequence a can be reduced by 6 as compared to the difference between the maximum value and the minimum value of the RDS of the sequence a (Ga) used in the IEEE 802.11ad SC PHY preamble.

The delay vector D used in generation of the sequences a and b used in the new preamble is [16 64 8 4 2 32 1] and the weight vector W is [−1 1 1 1 1 −1 1].

Meanwhile, the delay vector D of the sequences a and b (Ga and Gb) used in the IEEE 802.11ad SC PHY preamble is [1 8 2 4 16 32 64] and the weight vector W is [−1 −1 −1 −1 1 −1 −1].

FIG. 27 is a diagram illustrating specific examples of sequences a and b used in the new preamble where L=128 and sequences Ga and Gb used in the IEEE 802.11ad SC PHY preamble.

Respective sequences illustrated in FIG. 27 are Golay complementary sequences generated by applying the delay vector D and the weight vector W illustrated in FIG. 26 to the above formulas (38) to (41).

<About Transmitter>

Next, the transmitter 1 that transmits data using a frame including the new preamble will be described.

Figure 28:
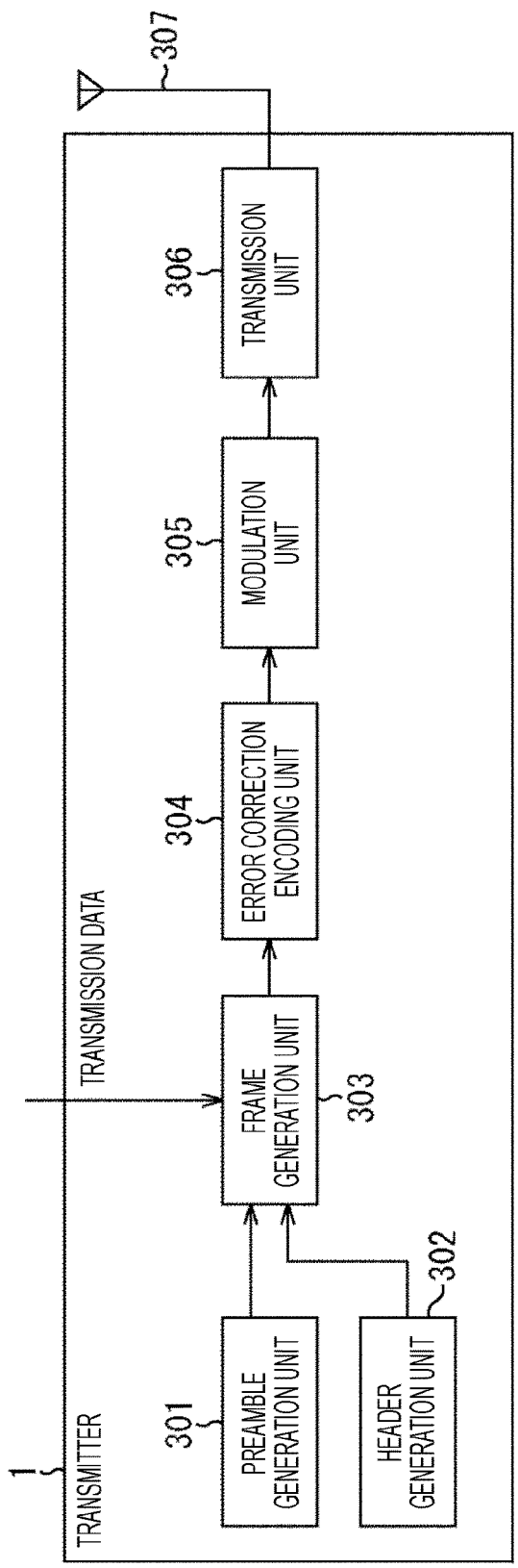
FIG. 28 is a block diagram illustrating an exemplary configuration of a transmitter.

FIG. 28 is a block diagram illustrating an exemplary configuration of the transmitter 1.

The transmitter 1 includes a preamble generation unit 301, a header generation unit 302, a frame generation unit 303, an error correction encoding unit 304, a modulation unit 305, and a transmission unit 306.

The preamble generation unit 301 generates the new preamble including the Golay complementary sequence illustrated in FIG. 27 and outputs the new preamble to the frame generation unit 303.

The header generation unit 302 generates a header including information related to error correction encoding of payload data, a modulation system and others and outputs the header to the frame generation unit 303.

The frame generation unit 303 generates the frame illustrated in FIG. 2 by adding the preamble supplied from the preamble generation unit 301 and the header supplied from the header generation unit 302 to a payload storing transmission data and outputs the frame to the error correction encoding unit 304.

The error correction encoding unit 304 performs error correction encoding on the data supplied from the frame generation unit 303 by a predetermined method and outputs data after error correction encoding to the modulation unit 305.

The modulation unit 305 modulates the data after correction encoding supplied from the error correction encoding unit 304 by a predetermined method and outputs a signal sequence of transmission symbols obtained by modulation to the transmission unit 306.

The transmission unit 306 performs various processing such as D/A conversion and, band limitation on the signal sequence supplied from the modulation unit 305, converts the analog baseband signal into an RF, and thereby transmits from an antenna 307.

Figure 29:
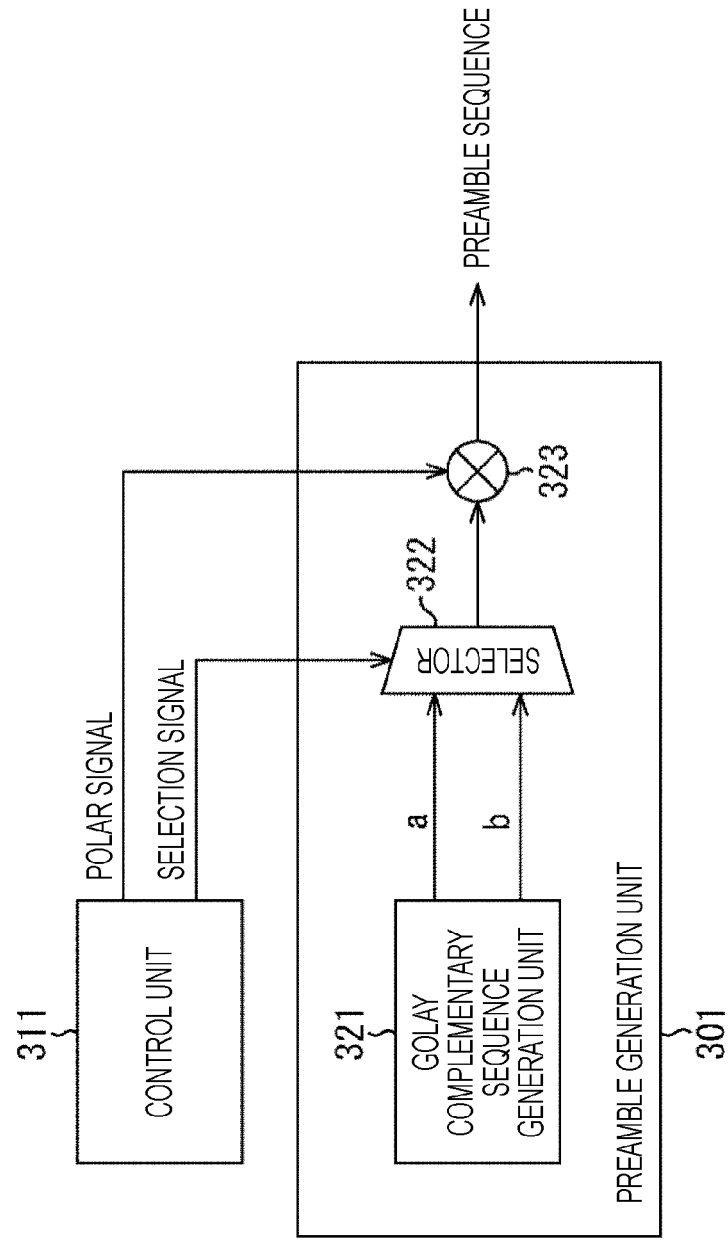
FIG. 29 is a block diagram illustrating an exemplary configuration of a preamble generation unit in FIG. 28.

FIG. 29 is a block diagram illustrating an exemplary configuration of a preamble generation unit 301 in FIG. 28.

The preamble generation unit 301 includes a Golay complementary sequence generation unit 321, a selector 322, and a multiplier 323. Operations of the selector 322 and the multiplier 323 are controlled by a control unit 311 not illustrated in FIG. 28.

The control unit 311 outputs a selection signal to the selector 322 and a polar signal to the multiplier 323 according to a structure of a new preamble. The selection signal represents which one of a sequence a and a sequence b that are Golay complementary sequences to be selected. The polar signal represents by which one of values +1 and −1 to multiply the sequence selected by the selector 322.

The Golay complementary sequence generation unit 321 generates and outputs the sequence a and the sequence b that are Golay complementary sequences that forms the preamble.

For example, the Golay complementary sequence generation unit 321 reads, from an internal RAM, a ROM, or a register, and outputs the sequences a and b having been generated in advance. The Golay complementary sequence generation unit 321 further applies the delay vector D and the weight vector W to formulas (38) to (41) and thereby generates and outputs the sequences a and b.

The selector 322 selects one of the sequences a and b supplied from the Golay complementary sequence generation unit 321 according to the selection signal supplied from the control unit 311 and outputs the sequences a and b in an order.

The multiplier 323 multiplies the signal sequence supplied from the selector 322 by +1 or −1 according to the polar signal supplied from the control unit 311 and outputs a preamble sequence. The preamble sequence output by the multiplier 323 is a signal sequence that includes any one of the synchronization sequences illustrated in FIG. 21.

The receiver 2 receives a transmitted from the transmitter 1 having such a configuration and performs frame synchronization by performing the frame synchronization processing in FIG. 12 using the new preamble.

The series of processing described above may be executed by hardware or may be executed by software. In the case of executing the series of processing by software, a program included in the software is installed, from a recording medium of the program, in a computer incorporated in dedicated hardware or a generic personal computer.

A computer that executes the series of processing described above by a program has the same configuration as that of the hardware illustrated in FIG. 23.

In a computer configured in the above manner, the series of processing described above is performed by the CPU 251, for example, loading a program stored in the storage unit 258 to the RAM 253 via the input/output interface 255 and the bus 254 and executing the program.

The program executed by the CPU 251 is recorded in the removable medium 261 for example or provided via a wired or wireless transmission medium such as a local area network, the Internet, and digital broadcasting, and installed in the storage unit 258.

Note that the program executed by the computer may perform processing in time series according to the order described herein or may perform processing in parallel or at necessary timing such as upon a call.

Note that, in the present description, a system means a collection of a plurality of components (devices, modules (parts), or the like) regardless of whether all the components are in the same housing. Therefore, any one of a plurality of devices in separate housings and connected via a network and one device where a plurality of modules is included in one housing is a system.

Note that effects described herein are merely examples and thus are limited. Other effects may also be included.

Embodiments of the present technology are not limited to the aforementioned embodiments and may include various modifications within a scope not departing from the principles of the present technology.

<Exemplary Combination of Configurations>

The present technology may employ configurations as follows.

(1)

A receiver, including:

a reception unit that receives signals of a frame having a preamble including a frame detection signal sequence, formed by a repetition of one type of known signal sequence of a first length, arranged in a head thereof and a frame synchronization signal sequence, formed by the one type of known signal sequence of a first length or an inverse sequence thereof, arranged subsequent to the frame detection signal sequence;

a convolution arithmetic operation unit that performs convolution arithmetic operation of a known correlation sequence of a second length determined on the basis of a peak value of cross-correlation between the signal sequence and the frame synchronization signal sequence in the preamble and cross-correlation between a received signal sequence and the frame synchronization signal sequence at time preceding predetermined time by a period of time corresponding to a product of an integer greater than or equal to zero and less than a value representing the second length and a value representing the first length; and a synchronization unit that ensures synchronization of the frame while regarding the predetermined time when a value more than or equal to a threshold value or a maximum value is obtained as a result of the convolution arithmetic operation as reception time of a last signal sequence that forms the frame synchronization signal sequence.

(2)

The receiver according to the item (1), wherein the known correlation sequence is determined on the basis of the peak value of cross-correlation between the signal sequence in the preamble and the frame synchronization signal sequence at time represented by $(K+N-n) \cdot L-1$, where:

time t at the head of the preamble satisfies t=0;

the number of repetitions of the one type of known signal sequence in the frame detection signal sequence is denoted as K;

the number of signal sequences that forms the frame synchronization signal sequence is denoted as N;

the first length is denoted as L;

the second length is denoted as S; and the integer greater than or equal to zero and less than S is denoted as n.

(3)

The receiver according to the item (1) or (2) wherein the known correlation sequence is determined on the basis of a sign of the peak value.

(4)

The receiver according to any one of the items (1) to (3), wherein the value representing the second length is the same value as the number of signal sequences forming the frame synchronization signal sequence or equivalent to the number of signal sequences, forming the frame synchronization signal sequence, added with one.

(5)

A frame synchronization method, including the steps of:

receiving, by a reception unit, signals of a frame having a preamble including a frame detection signal sequence, formed by a repetition of one type of known signal sequence of a first length, arranged in a head thereof and a frame synchronization signal sequence, formed by the one type of known signal sequence of a first length or an inverse sequence thereof, arranged subsequent to the frame detection signal sequence;

performing, by a convolution arithmetic operation unit, convolution arithmetic operation of a known correlation sequence of a second length determined on the basis of a peak value of cross-correlation between the signal sequence and the frame synchronization signal sequence in the preamble and cross-correlation between a received signal sequence and the frame synchronization signal sequence at time preceding predetermined time by a period of time corresponding to a product of an integer greater than or equal to zero and less than a value representing the second length and a value representing the first length; and ensuring, by a synchronization unit, synchronization of the frame while regarding the predetermined time when a value more than or equal to a threshold value or a maximum value is obtained as a result of the convolution arithmetic operation as reception time of a last signal sequence that forms the frame synchronization signal sequence.

(6)
A program for causing a computer to execute processing, including the steps of:

receiving, by a reception unit, signals of a frame having a preamble including a frame detection signal sequence, formed by a repetition of one type of known signal sequence of a first length, arranged in a head thereof and a frame synchronization signal sequence, formed by the one type of known signal sequence of the first length or an inverse sequence thereof, arranged subsequent to the frame detection signal sequence;

performing, by a convolution arithmetic operation unit, convolution arithmetic operation of a known correlation sequence of a second length determined on the basis of a peak value of cross-correlation between the signal sequence and the frame synchronization signal sequence in the preamble and cross-correlation between a received signal sequence and the frame synchronization signal sequence at time preceding predetermined time by a period of time corresponding to a product of an integer greater than or equal to zero and less than a value representing the second length and a value representing the first length; and ensuring, by a synchronization unit, synchronization of the frame while regarding the predetermined time when a value more than or equal to a threshold value or a maximum value is obtained as a result of the convolution arithmetic operation as reception time of a last signal sequence that forms the frame synchronization signal sequence.

(7)
A transmitter, including:
a preamble generation unit that generates a preamble including, a frame detection signal sequence formed by a repetition of one type of known signal sequence of a length L that is a first length, a frame synchronization signal sequence of a length N·L formed by two types of known signal sequences of a length L including the one type of known signal sequence or inverse sequences of the two types of known signal sequences, and a channel estimation signal sequence formed by the two types of known signal sequences and the inverse sequences, in the order mentioned, wherein, where a signal sequence of a length P·L formed by the frame synchronization signal sequence and leading signal sequences of the channel estimation signal sequence are used as a synchronization sequence used for frame synchronization, the preamble, which satisfies that a maximum value of a difference between a value at a last bit position and a value at another position in the synchronization sequence of likelihood information obtained by performing convolution arithmetic operation of a known correlation sequence of a second length determined on the basis of a peak value of cross-correlation between the signal sequence of the preamble and the synchronization sequence and cross-correlation between a received signal sequence and the synchronization sequence at time preceding predetermined time by a period of time corresponding to a product of an integer greater than or equal to zero and less than a value representing the second length and a value representing the first length, satisfies any one of:
3·L, where P=2;
5·L, where P=3;
7·L, where P=4;
10·L, where P=5;
13·L, where P=6; and
16·L, where P=7.

(8)
The transmitter according to the item (7),
wherein the frame synchronization signal sequence is [−a], where N=1, the two types of known signal sequences are {a, b}, and the inverse sequences are {−a, −b}.

(9)
The transmitter according to the item (8),
wherein the leading signal sequence of the channel estimation signal sequence is [b], where P=2.

(10)
The transmitter according to the item (8),
wherein the leading two signal sequences of the channel estimation signal sequence are [−b b] or [b −b], where P=3.

(11)
The transmitter according to the item (8),
wherein the leading three signal sequences of the channel estimation signal sequence are [b a −a], [−b a −a], [−b b a], [b −b a], [a a b], [a −a b], [a a −b], or [a −a −b], where P=4.

(12)
The transmitter according to the item (8),
wherein the leading four signal sequences of the channel estimation signal sequence are [−a −a a a] or [−a a a −a], where P=5.

(13)
The transmitter according to the item (8),
wherein the leading five signal sequences of the channel estimation signal sequence are [−a b a a −a], [−a −b a a −a], [−a −b a b b], or [−a b a −b −b], where P=6.

(14)
The transmitter according to the item (8),
wherein the leading six signal sequences of the channel estimation signal sequence are [−a −a a a a −a], [−a b b a a −a], [−a −b −a a a −a], [−b b b −b b a], [−b b −b −a b a], [b −b b b −b a], or [b −b −a b −b a], where P=7.

(15)
The transmitter according to any one of the items (8) to (14),
wherein the two types of known signal sequences {a, b} are Golay complementary sequences of a length $L=2^N$ where a CDS is the smallest and a difference between the maximum value and the minimum value of an RDS is the smallest.

(16)
The transmitter according to the item (15),
wherein the two types of known signal sequences {a, b} are generated using a delay vector where an element $D_{i+1}$ is the largest among signal sequences where an element $D_i$ is the largest with respect to the element $D_i$ where i=0 to i=N−2 of a delay vector $D=[D_0, D_1, \ldots, D_{N-1}]$ that is used for generation of the Golay complementary sequence.

(17)

The transmitter according to the item (16), wherein the two types of known signal sequences {a, b} have the largest total value of elements in a weight vector $W=[W_0, W_1, \ldots, W_{N-1}]$ that is used for generation of the Golay complementary sequence.

(18)

The transmitter according to any one of the items (8) to (17), wherein L=128, a=0xA9A6A9A6303F303FA95956A630C0CF3F (LSB first), and b=0x030C030C9A959A9503F3FC0C9A6A6595 (LSB first).

(19)

A transmission method, including the step of:

generating a preamble including, a frame detection signal sequence formed by a repetition of one type of known signal sequence of a length L that is a first length, a frame synchronization signal sequence of a length N·L formed by two types of known signal sequences of a length L including the one type of known signal sequence or inverse sequences of the two types of known signal sequences, and a channel estimation signal sequence formed by the two types of known signal sequences and the inverse sequences, in the order mentioned, wherein, where a signal sequence of a length P·L formed by the frame synchronization signal sequence and leading signal sequences of the channel estimation signal sequence are used as a synchronization sequence used for frame synchronization, the preamble, which satisfies that a maximum value of a difference between a value at a last bit position and a value at another position in the synchronization sequence of likelihood information obtained by performing convolution arithmetic operation of a known correlation sequence of a second length determined on the basis of a peak value of cross-correlation between the signal sequence of the preamble and the synchronization sequence and cross-correlation between a received signal sequence and the synchronization sequence at time preceding predetermined time by a period of time corresponding to a product of an integer greater than or equal to zero and less than a value representing the second length and a value representing the first length, satisfies any one of:

3·L, where P=2;
5·L, where P=3;
7·L, where P=4;
10·L, where P=5;
13·L, where P=6; and
16·L, where P=7.

(20)

A program for causing a computer to execute processing, including the step of:

generating a preamble including, a frame detection signal sequence formed by a repetition of one type of known signal sequence of a length L that is a first length, a frame synchronization signal sequence of a length N·L formed by two types of known signal sequences of a length L including the one type of known signal sequence or inverse sequences of the two types of known signal sequences, and a channel estimation signal sequence formed by the two types of known signal sequences and the inverse sequences, in the order mentioned, wherein, where a signal sequence of a length P·L formed by the frame synchronization signal sequence and leading signal sequences of the channel estimation signal sequence are used as a synchronization sequence used for frame synchronization, the preamble, which satisfies that a maximum value of a difference between a value at a last bit position and a value at another position in the synchronization sequence of likelihood information obtained by performing convolution arithmetic operation of a known correlation sequence of a second length determined on the basis of a peak value of cross-correlation between the signal sequence of the preamble and the synchronization sequence and cross-correlation between a received signal sequence and the synchronization sequence at time preceding predetermined time by a period of time corresponding to a product of an integer greater than or equal to zero and less than a value representing the second length and a value representing the first length, satisfies any one of:

3·L, where P=2;
5·L, where P=3;
7·L, where P=4;
10·L, where P=5;
13·L, where P=6; and
16·L, where P=7.

REFERENCE SIGNS LIST

1 Transmitter
2 Receiver
14 Synchronization unit
31 Cross-correlation calculation unit
32 Multiplication unit
33 Delay unit
34 Multiplication unit
35 Addition unit
36 Delay unit
37 Multiplication unit
38 Addition unit
39 Detection unit

What is claimed is:

1. A receiver, comprising:
a reception unit that receives signals of a frame having a preamble including a frame detection signal sequence, formed by a repetition of one type of known signal sequence of a first length, arranged in a head thereof and a frame synchronization signal sequence, formed by the one type of known signal sequence of a first length or an inverse sequence thereof, arranged subsequent to the frame detection signal sequence;
a convolution arithmetic operation unit that performs a convolution arithmetic operation of a known correlation sequence of a second length determined on the basis of a peak value of cross-correlation between the signal sequence and the frame synchronization signal sequence in the preamble and cross-correlation between a received signal sequence and the frame synchronization signal sequence at a time preceding a predetermined time by a period of time corresponding to a product of an integer greater than or equal to zero and less than a value representing the second length and a value representing the first length; and
a synchronization unit that ensures synchronization of the frame while regarding the predetermined time when a value more than or equal to a threshold value or a maximum value is obtained as a result of the convolution arithmetic operation as a reception time of a last signal sequence that forms the frame synchronization signal sequence.

2. The receiver according to claim 1,
wherein the known correlation sequence is determined on the basis of the peak value of cross-correlation between the signal sequence in the preamble and the frame synchronization signal sequence at a time represented by $(K+N-n) \cdot L-1$,
where:
a time t at the head of the preamble satisfies $t=0$;
the number of repetitions of the one type of known signal sequence in the frame detection signal sequence is denoted as K;
the number of signal sequences that forms the frame synchronization signal sequence is denoted as N;
the first length is denoted as L;
the second length is denoted as S; and
the integer greater than or equal to zero and less than S is denoted as n.

3. The receiver according to claim 2,
wherein the known correlation sequence is determined on the basis of a sign of the peak value.

4. The receiver according to claim 1,
wherein the value representing the second length is the same value as the number of signal sequences forming the frame synchronization signal sequence or equivalent to the number of signal sequences, forming the frame synchronization signal sequence, added with one.

5. A frame synchronization method, comprising the steps of:
receiving, by a reception unit, signals of a frame having a preamble including a frame detection signal sequence, formed by a repetition of one type of known signal sequence of a first length, arranged in a head thereof and a frame synchronization signal sequence, formed by the one type of known signal sequence of the first length or an inverse sequence thereof, arranged subsequent to the frame detection signal sequence;
performing, by a convolution arithmetic operation unit, a convolution arithmetic operation of a known correlation sequence of a second length determined on the basis of a peak value of cross-correlation between the signal sequence and the frame synchronization signal sequence in the preamble and cross-correlation between a received signal sequence and the frame synchronization signal sequence at a time preceding a predetermined time by a period of time corresponding to a product of an integer greater than or equal to zero and less than a value representing the second length and a value representing the first length; and
ensuring, by a synchronization unit, synchronization of the frame while regarding the predetermined time when a value more than or equal to a threshold value or a maximum value is obtained as a result of the convolution arithmetic operation as a reception time of a last signal sequence that forms the frame synchronization signal sequence.

6. A program for causing a computer to execute processing, comprising the steps of:
receiving, by a reception unit, signals of a frame having a preamble including a frame detection signal sequence, formed by a repetition of one type of known signal sequence of a first length, arranged in a head thereof and a frame synchronization signal sequence, formed by the one type of known signal sequence of the first length or an inverse sequence thereof, arranged subsequent to the frame detection signal sequence;
performing, by a convolution arithmetic operation unit, a convolution arithmetic operation of a known correlation sequence of a second length determined on the basis of a peak value of cross-correlation between the signal sequence and the frame synchronization signal sequence in the preamble and cross-correlation between a received signal sequence and the frame synchronization signal sequence at a time preceding a predetermined time by a period of time corresponding to a product of an integer greater than or equal to zero and less than a value representing the second length and a value representing the first length; and
ensuring, by a synchronization unit, synchronization of the frame while regarding the predetermined time when a value more than or equal to a threshold value or a maximum value is obtained as a result of the convolution arithmetic operation as a reception time of a last signal sequence that forms the frame synchronization signal sequence.

7. A transmitter, comprising:
a preamble generation unit that generates a preamble including a frame detection signal sequence formed by a repetition of one type of known signal sequence of a length L that is a first length, a frame synchronization signal sequence of a length $N \cdot L$ formed by two types of known signal sequences of a length L including the one type of known signal sequence or inverse sequences of the two types of known signal sequences, where N is a number of known signal sequences, and a channel estimation signal sequence formed by the two types of known signal sequences and the inverse sequences, in the order mentioned,
wherein, where a signal sequence of a length $P \cdot L$ formed by the frame synchronization signal sequence and leading signal sequences of the channel estimation signal sequence are used as a synchronization sequence used for frame synchronization, where P is a spreading code sequence,
wherein the preamble, which satisfies the condition that a maximum value of a difference between a value at a last bit position and a value at another position in the synchronization sequence of likelihood information obtained by performing a convolution arithmetic operation of a known correlation sequence of a second length determined on the basis of a peak value of cross-correlation between the signal sequence of the preamble and the synchronization sequence and cross-correlation between a received signal sequence and the synchronization sequence at a time preceding a predetermined time by a period of time corresponding to a product of an integer greater than or equal to zero and less than a value representing the second length and a value representing the first length, satisfies any one of:
$3 \cdot L$, where $P=2$;
$5 \cdot L$, where $P=3$;
$7 \cdot L$, where $P=4$;
$10 \cdot L$, where $P=5$;
$13 \cdot L$, where $P=6$; and
$16 \cdot L$, where $P=7$.

8. The transmitter according to claim 7,
wherein the frame synchronization signal sequence is $[-a]$, where $N=1$, the two types of known signal sequences are $\{a, b\}$, and the inverse sequences are $\{-a, -b\}$.

9. The transmitter according to claim 8,
wherein the leading signal sequence of the channel estimation signal sequence is $[b]$, where $P=2$.

10. The transmitter according to claim 8,
wherein the leading two signal sequences of the channel estimation signal sequence are [−b b] or [b −b],
where P=3.

11. The transmitter according to claim 8,
wherein the leading three signal sequences of the channel estimation signal sequence are [b a −a], [−b a −a], [−b b a], [b −b a], [a a b], [a −a b], [a a −b], or [a −a −b],
where P=4.

12. The transmitter according to claim 8,
wherein the leading four signal sequences of the channel estimation signal sequence are [−a −a a a] or [−a a a −a],
where P=5.

13. The transmitter according to claim 8,
wherein the leading five signal sequences of the channel estimation signal sequence are [−a b a a −a], [−a −b a a −a], [−a −b a b b], or [−a b a −b −b],
where P=6.

14. The transmitter according to claim 8,
wherein the leading six signal sequences of the channel estimation signal sequence are [−a −a a a a −a], [−a b b a a −a], [−a −b −b a a −a], [−b b b −b b a], [−b b −b −b b a], [b −b b b −b a], or [b −b −b b −b a],
where P=7.

15. The transmitter according to claim 8,
wherein the two types of known signal sequences {a, b} are Golay complementary sequences of a length $L=2^N$ where a code-word sum (CDS) is the smallest and a difference between a maximum value and a minimum value of a running digital sum (RDS) is the smallest.

16. The transmitter according to claim 15,
wherein the two types of known signal sequences {a, b} are generated using a delay vector where an element $D_{i+1}$ is the largest among signal sequences where an element $D_i$ is the largest with respect to the element $D_i$ where i=0 to i=N −2 in a delay vector $D=[D_0, D_1, \ldots, D_{N-1}]$ that is used for generation of the Golay complementary sequence.

17. The transmitter according to claim 16,
wherein the two types of known signal sequences {a, b} have the largest total value of elements in a weight vector $W=[W_0, W_1, \ldots, W_{N-1}]$ that is used for generation of the Golay complementary sequence.

18. The transmitter according to claim 17,
wherein L=128 holds,
a=0xA9A6A9A6303F303FA95956A630C0CF3F (LSB first) holds, and
b=0x030C030C9A959A9503F3FC0C9A6A6595 (LSB first) holds.

19. A transmission method, comprising the step of:
generating a preamble including a frame detection signal sequence formed by a repetition of one type of known signal sequence of a length L that is a first length, a frame synchronization signal sequence of a length N·L formed by two types of known signal sequences of a length L including the one type of known signal sequence or inverse sequences of the two types of known signal sequences, where N is a number of known signal sequences, and a channel estimation signal sequence formed by the two types of known signal sequences and the inverse sequences, in the order mentioned,
wherein, where a signal sequence of a length P·L formed by the frame synchronization signal sequence and leading signal sequences of the channel estimation signal sequence are used as a synchronization sequence used for frame synchronization, where P is a spreading code sequence,
the preamble, which satisfies that a maximum value of a difference between a value at a last bit position and a value at another position in the synchronization sequence of likelihood information obtained by performing a convolution arithmetic operation of a known correlation sequence of a second length determined on the basis of a peak value of cross-correlation between the signal sequence of the preamble and the synchronization sequence and cross-correlation between a received signal sequence and the synchronization sequence at a time preceding a predetermined time by a period of time corresponding to a product of an integer greater than or equal to zero and less than a value representing the second length and a value representing the first length, satisfies any one of:
3·L, where P=2;
5·L, where P=3;
7·L, where P=4;
10·L, where P=5;
13·L, where P=6; and
16·L, where P=7.

20. A program for causing a computer to execute processing, including the step of:
generating a preamble including a frame detection signal sequence formed by a repetition of one type of known signal sequence of a length L that is a first length, a frame synchronization signal sequence of a length N·L formed by two types of known signal sequences of a length L including the one type of known signal sequence or inverse sequences of the two types of known signal sequences, where N is a number of known signal sequences, and a channel estimation signal sequence formed by the two types of known signal sequences and the inverse sequences, in the order mentioned,
wherein, where a signal sequence of a length P·L formed by the frame synchronization signal sequence and leading signal sequences of the channel estimation signal sequence are used as a synchronization sequence used for frame synchronization, where P is a spreading code sequence,
the preamble, which satisfying that a maximum value of a difference between a value at a last bit position and a value at another position in the synchronization sequence of likelihood information obtained by performing a convolution arithmetic operation of a known correlation sequence of a second length determined on the basis of a peak value of cross-correlation between the signal sequence of the preamble and the synchronization sequence and cross-correlation between a received signal sequence and the synchronization sequence at a time preceding a predetermined time by a period of time corresponding to a product of an integer greater than or equal to zero and less than a value representing the second length and a value representing the first length, satisfies any one of:
3·L, where P=2;
5·L, where P=3;
7·L, where P=4;
10·L, where P=5;
13·L, where P=6; and
16·L, where P=7.

* * * * *